United States Patent
Cawse et al.

(10) Patent No.: US 11,526,835 B2
(45) Date of Patent: Dec. 13, 2022

(54) ASSET TRAVEL MONITORING WITH LINKED ASSET TRACKING DEVICES

(71) Applicant: Geotab Inc., Oakville (CA)

(72) Inventors: Neil Charles Cawse, Oakville (CA);
Jonathan Bean, Englewood, CO (US);
Christopher J. Mendes, Kitchener (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 17/579,269

(22) Filed: Jan. 19, 2022

(65) Prior Publication Data

US 2022/0147922 A1    May 12, 2022

Related U.S. Application Data

(63) Continuation-in-part of application No. 16/895,508, filed on Jun. 8, 2020, and a continuation-in-part of
(Continued)

(51) Int. Cl.
  *G06Q 10/08* (2012.01)
  *H04W 4/38* (2018.01)
  (Continued)

(52) U.S. Cl.
  CPC ........ *G06Q 10/0833* (2013.01); *H04W 4/021* (2013.01); *H04W 4/38* (2018.02);
  (Continued)

(58) Field of Classification Search
  CPC ............. G06Q 10/083; G06Q 10/0832; G06Q 10/0833; G06Q 10/0835; G06Q 10/0837; G06Q 10/0838
  See application file for complete search history.

(56) References Cited

U.S. PATENT DOCUMENTS

| 5,712,789 A | 1/1998 | Radican |
| 7,069,239 B2 | 6/2006 | Fawcett et al. |

(Continued)

FOREIGN PATENT DOCUMENTS

| EP | 3 190 599 A1 | 7/2017 |
| EP | 3190599 B1 | 9/2019 |

(Continued)

OTHER PUBLICATIONS

José Santa, Miguel A. Zamora-Izquierdo, Antonio J. Jara, Antonio F. Gomez-Skarmeta, Telematic platform for integral management of agricultural/perishable goods in terrestrial logistics, Computers and Electronics in Agriculture, vol. 80, 2012, pp. 31-40, (Year: 2012).*

(Continued)

*Primary Examiner* — Emmett K. Walsh
(74) *Attorney, Agent, or Firm* — Wolf, Greenfield & Sacks, P.C.

(57) ABSTRACT

A method for inferring a status asset information from data of a first type gathered by a first asset tracking device is provided. The method includes determining that a first asset tracking device coupled to a first asset and a second asset tracking device coupled to a second asset are travelling together, that the first asset tracking device has a first operating mode, and that the second asset tracking device has a second operating mode, which is different from the first operating mode of the first asset tracking device. In response, the second asset tracking device enters into a low-power mode in which it either does not gather data of the first type or does so at a reduced rate. Status information related to the second asset may be inferred from data of the first type gathered by the first asset tracking device.

19 Claims, 26 Drawing Sheets

Related U.S. Application Data application No. 16/895,554, filed on Jun. 8, 2020, application No. 17/579,269, filed on Jan. 19, 2022, which is a continuation-in-part of application No. 16/895,655, filed on Jun. 8, 2020.

(60) Provisional application No. 63/012,995, filed on Apr. 21, 2020.

(51) Int. Cl.
*H04W 4/021* (2018.01)
*H04W 52/02* (2009.01)
*H04W 52/28* (2009.01)
*H04W 64/00* (2009.01)

(52) U.S. Cl.
CPC ..... *H04W 52/0277* (2013.01); *H04W 52/283* (2013.01); *H04W 64/003* (2013.01)

(56) References Cited

U.S. PATENT DOCUMENTS

| | | | |
|---|---|---|---|
| 7,405,655 | B2 | 7/2008 | Ng et al. |
| 7,484,663 | B2 | 2/2009 | Olsen, III et al. |
| 7,667,438 | B2 | 2/2010 | Ashtiani |
| 7,821,416 | B2 | 10/2010 | Venture et al. |
| 8,515,413 | B1 | 8/2013 | Schilit |
| 10,173,486 | B1 | 1/2019 | Lee |
| 10,356,577 | B1 * | 7/2019 | Kugler ................. G08G 1/123 |
| 10,957,204 | B1 | 3/2021 | Kumar et al. |
| 2005/0189919 | A1 | 9/2005 | Tsuchiya |
| 2008/0061963 | A1 | 3/2008 | Schnitz et al. |
| 2009/0204354 | A1 * | 8/2009 | Davis ................. H04W 84/18 702/89 |
| 2011/0133888 | A1 | 6/2011 | Stevens et al. |
| 2013/0278227 | A1 | 10/2013 | Knitt |
| 2014/0125501 | A1 | 5/2014 | Baade |
| 2014/0372335 | A1 | 12/2014 | Jones |
| 2015/0243172 | A1 | 8/2015 | Eskilson |
| 2016/0212586 | A1 | 7/2016 | Ziskind et al. |
| 2017/0278061 | A1 * | 9/2017 | Skaaksrud ........... H04W 4/029 |
| 2018/0059251 | A1 | 3/2018 | Elliott |
| 2019/0066042 | A1 | 2/2019 | Conlon |
| 2019/0103755 | A1 | 4/2019 | Seberger |
| 2019/0220077 | A1 | 7/2019 | Tuan |
| 2019/0391634 | A1 | 12/2019 | Ayoub |
| 2020/0160722 | A1 | 5/2020 | Brugman |
| 2020/0412163 | A1 | 12/2020 | Huang et al. |
| 2021/0264789 | A1 | 8/2021 | Jo |
| 2021/0304120 | A1 | 9/2021 | Hill |
| 2021/0304592 | A1 | 9/2021 | Lepp |
| 2021/0325547 | A1 | 10/2021 | Howell |
| 2021/0326807 | A1 | 10/2021 | Howell |
| 2021/0328451 | A1 | 10/2021 | Howell |

FOREIGN PATENT DOCUMENTS

| | | | | |
|---|---|---|---|---|
| EP | 3 598 359 | A1 | 1/2020 | |
| EP | 3598359 | A1 | 1/2020 | |
| GB | 2540039 | A * | 1/2017 | .......... B60W 30/165 |
| GB | 2540039 | A | 1/2017 | |
| WO | 2020069581 | W | 4/2020 | |
| WO | WO 2020/069581 | A1 | 4/2020 | |

OTHER PUBLICATIONS

U.S. Appl. No. 16/895,508, filed Jun. 8, 2020, Howell et al.
U.S. Appl. No. 16/895,554, filed Jun. 8, 2020, Howell et al.
U.S. Appl. No. 16/895,655, filed Jun. 8, 2020, Howell et al.
EP21164800.1, Sep. 14, 2021, Extended European Search Report.
EP21167307.4, Sep. 15, 2021, Extended European Search Report.
EP21166513.8, Sep. 16, 2021, Extended European Search Report.
Extended European Search Report for European Application No. 21164800.1, dated Sep. 14, 2021.
Extended European Search Report for European Application No. 21166513.8, dated Sep. 16, 2021.
Extended European Search Report for European Application No. 21167307.4, dated Sep. 15, 2021.

* cited by examiner

ASSET TRAVEL MONITORING WITH LINKED ASSET TRACKING DEVICES

RELATED APPLICATIONS

This application claims the benefit under 35 U.S.C. § 120 as a continuation-in-part of U.S. application Ser. No. 16/895,508, filed Jun. 8, 2020 and titled "MOTION SENSORS IN ASSET TRAVEL MONITORING", and as a continuation-in-part of U.S. application Ser. No. 16/895,554, filed Jun. 8, 2020 and titled "TEMPERATURE-DEPENDENT CHARGING OF ASSET TRACKING DEVICES", and as a continuation-in-part of U.S. application Ser. No. 16/895,655, filed Jun. 8, 2020 and titled "ASSET TRAVEL MONITORING WITH LINKED ASSET TRACKING DEVICES", each of which claims priority under 35 USC 119(e) to U.S. Application Ser. No. 63/012,995, filed Apr. 21, 2020 and titled "MOTION SENSORS IN ASSET TRAVEL MONITORING, TEMPERATURE-DEPENDENT CHARGING OF ASSET TRACKING DEVICES, AND ASSET TRAVEL MONITORING WITH LINKED ASSET TRACKING DEVICES". Each of the foregoing applications is incorporated by reference herein in its entirety.

FIELD

The present disclosure relates to telematics, and in particular to asset tracking devices and asset tracking device management systems for monitoring the movement of assets.

BACKGROUND

The movement of an asset may be monitored by the placement of an asset tracking device on the asset. An asset tracking device may communicate with a satellite navigation system, such as a Global Positioning System (GPS), Global Navigation Satellite System (GNSS), cellular tower network, Wi-Fi network, or other system which enables the monitoring of the location of the asset tracking device. Such an asset tracking device may periodically obtain its location from such a locating system and transmit its location to an asset tracking device management system that records movements of the asset. Asset tracking devices and asset tracking device management systems may be used to monitor the movement of vehicular assets such as trucks, ships, and cars, and non-vehicular assets such as transport trailers, shipping containers, pallets, shipped goods, or any other asset which may be tracked by an asset tracking device.

SUMMARY

In one aspect of the present disclosure, there is provided a method comprising determining that a first asset tracking device coupled to a first asset and a second asset tracking device coupled to a second asset are travelling together, determining that the first asset tracking device has a first operating mode, and determining that the second asset tracking device has a second operating mode which is different from the first operating mode. In response to determining that the first asset tracking device and the second asset tracking device are travelling together, determining that the first asset tracking device has a first operating mode, and determining that the second asset tracking device has a second operating mode, the method further comprises causing the second asset tracking device to enter into a low-power mode and inferring a second asset status information from data of a first type gathered by the first asset tracking device. In the low-power operating mode the second asset tracking device is not gathering data of a first type, or the second asset tracking device is gathering data of the first type at a reduced rate.

Determining that the first asset tracking device and the second asset tracking device are travelling together may comprise determining, by an asset tracking device management system, that the first asset tracking device has a first travel history which is similar to a second travel history of the second asset tracking device.

Determining that the first travel history is similar to the second travel history may comprise comparing a first plurality of locations reported by the first asset tracking device and a second plurality of locations reported by the second asset tracking device, the first plurality of locations and the second plurality of locations reported at substantially similar times, and determining that the first plurality of locations and the second plurality of locations are substantially equal.

Determining that the first asset tracking device and the second asset tracking device are travelling together may comprise detecting, by the first asset tracking device, a short-range communication connection between the first asset tracking device and the second asset tracking device The short-range communication connection may comprise a short-range wireless connection over the industrial, scientific or medical (ISM) unlicensed band.

The short-range communication connection may comprise a Bluetooth connection, and detecting a short-range communication connection between the first asset tracking device and the second asset tracking device may comprise detecting that the second asset tracking device is paired to the first asset tracking device over the Bluetooth connection.

Determining that the first asset tracking device and the second asset tracking device are travelling together may comprise detecting, by the first asset tracking device, a unique identifier linked to the second asset.

The unique identifier may comprise an image of a barcode identifying the second asset.

Detecting the unique identifier may comprise capturing an image by an image-capturing device connected with the first asset tracking device and recognizing the unique identifier within the image.

The image-capturing device may be connected with the first asset tracking device via an input/output expander.

Determining that the first asset tracking device has a first operating mode may comprise determining that the first asset tracking device is connected to an external power source.

Determining that the second asset tracking device has a second operating mode may comprise determining that the second asset tracking device is powered by an energy harvester.

Causing the second asset tracking device to enter into the low-power operating mode may only be done in response to determining that a locating device of the second asset tracking device does not have sufficient power.

Causing the second asset tracking device to enter into the low-power operating mode may only be done in response to determining that a communication interface of the second asset tracking device does not have sufficient power.

Causing the second asset tracking device to enter into a low-power operating mode in which the second asset tracking device is not gathering data of a first type may comprise turning off a communication interface of the second asset tracking device.

The communication interface may comprise a cellular modem.

Data of the first type may comprise location data and causing the second asset tracking device to enter into a low-power operating mode in which the second asset tracking device is not gathering data of a first type may comprise turning off a location module of the second asset tracking device.

Causing the second asset tracking device to enter into a low-power operating mode in which the second asset tracking is gathering data of the first type at a reduced rate may comprises causing the second asset tracking device to enter into a low-power operating mode, and causing the second asset tracking device to periodically exit low-power mode and gather data of the first type.

Causing the second asset tracking device to periodically exit low-power mode and gather data of the first type may comprise periodically turning on a sensor module for gathering data of the first type, and reading sensor data of the first type from the sensor module while the sensor module is turned on.

The method may further comprise determining that the first asset tracking device and the second asset tracking device are no longer travelling together. In response to determining that the first asset tracking device and the second asset tracking device are no longer travelling together, the method may further include causing the second asset tracking device to exit from the low-power operating mode, and inferring the second asset status information from data of the first type gathered by the second asset tracking device. Causing the second asset tracking device to exit from the low-power operating mode may include gathering data of the first type at a regular rate and sending the data of the first type to an asset tracking device management system.

Determining that the first asset tracking device and the second asset tracking device are travelling together may comprise detecting that the first asset tracking device and the second asset tracking device have each crossed at least one tripwire at substantially the same time.

Determining that the first asset tracking device and the second asset tracking device are travelling together may comprise detecting that the first asset tracking device and the second asset tracking device have each: entered a zone, exited the zone, or remained within the zone at substantially the time wherein the zone is defined by a geofence.

DETAILED DESCRIPTION

Figure 1:
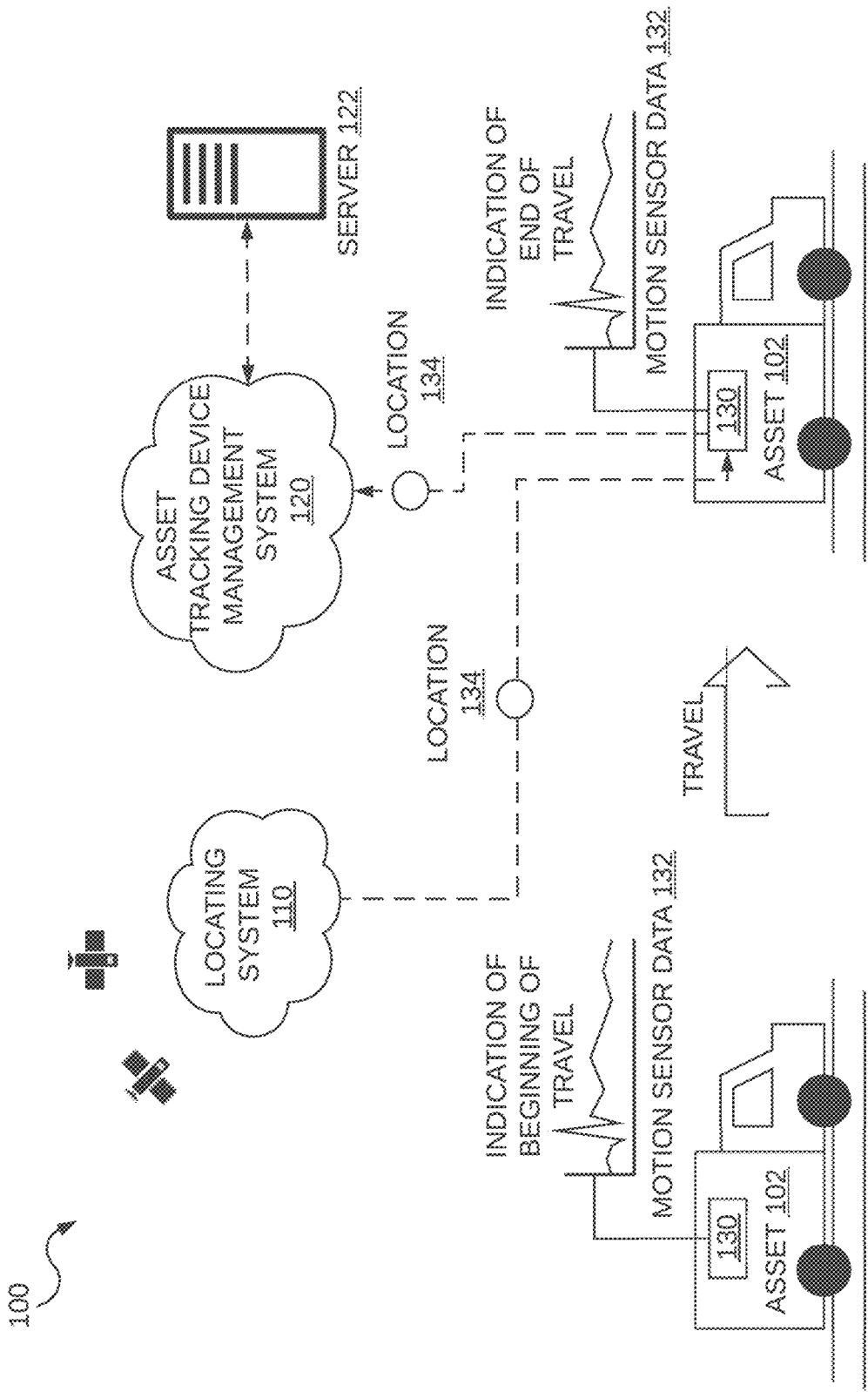
FIG. 1 is a schematic diagram of an example system for asset travel monitoring that includes motion sensors to determine whether an asset is in travel.

An asset tracking device generally operates remotely from any fixed power source. In some cases, an asset tracking device may tap into a mobile power source located directly on an asset that it is tracking. For example, an asset tracking device tracking the movements of a vehicle, such as a car or truck, may draw power from the vehicle battery, which will generally have a capacity that is sufficiently large, and that is renewed sufficiently regularly, to power the asset tracking device indefinitely.

However, in many cases, an asset tracking device may be used to monitor an asset that does not have a large mobile power source that the asset tracking device may draw from. For example, an asset tracking device may be placed on a transport trailer, a shipping container, a shipment pallet, or another asset on which there is no usable power supply. In such cases, the asset tracking device may include an onboard power supply such as a battery, and may further include an energy harvesting system such as a solar panel, Peltier device, kinetic energy harvesting device, or other energy harvesting system to power the asset tracking device. In such cases, power management of the asset tracking device is an important factor in preserving the utility of the asset tracking device.

Although location tracking may be a primary purpose of an asset tracking device, it may be taxing on its power supply to frequently obtain the location of the asset tracking device, which may be of particular concern in the case where the asset tracking device does not have an outside power source to tap into. Communicating with a locating system such as a GPS or GNSS system to obtain the location of the asset tracking device and transmitting the location to an asset management tracking system may consume a significant amount of power. Therefore, an operating scheme for the asset tracking device that involves regularly and indiscriminately obtaining the location of the asset tracking device may not be conducive to energy conservation and to preserving the utility of the asset tracking device.

Thus, the present disclosure provides asset tracking devices and methods to operate asset tracking devices that use motion sensors to determine when to obtain and transmit location information to asset tracking device management systems. The techniques described herein may conserve power as compared to obtaining and transmitting location information on a fixed schedule. These techniques may be particularly useful for the tracking of non-vehicular assets where there is no external power source for an asset tracking device to tap into.

The present disclosure further provides asset tracking devices and methods to operate asset tracking devices. The techniques described herein may be particularly useful when supercapacitors are used as energy storage units.

The present disclosure further provides asset tracking device management systems and methods to operate asset tracking device management systems which provide for the synchronized tracking of groups of assets that travel together. The techniques described herein may involve analyzing travel histories of assets and identifying two or more assets that are likely to be travelling together. Synchronized tracking of assets that travel together may be particularly useful for the tracking of a large group of assets that includes both vehicular and non-vehicular assets where the vehicular assets tend to transport the non-vehicular assets, for example, in the case of transport trucks pulling transport trailers.

FIG. 1 is a schematic diagram of a system 100 for asset travel monitoring, in accordance with embodiments of the present disclosure. The system 100 includes a locating system 110 for tracking the locations of one or more asset tracking devices, including an asset tracking device 130. The locating system 110 may include a Global Positioning System (GPS), a Global Navigation Satellite System (GNSS), a cellular tower network, Wi-Fi networks, or another system which enables the monitoring of the location of the asset tracking device 130.

The system 100 further includes an asset tracking device management system 120 for storing locations and travel histories of one or more asset tracking devices, including the asset tracking device 130. The asset tracking device management system 120 may further store information such as associations between asset tracking devices and assets being tracked, user accounts, and other information related to the monitoring of asset tracking devices. For example, the asset tracking device management system 120 may store the types and/or versions of asset tracking devices being monitored, the types of assets being tracked (e.g., vehicles, non-vehicular assets), and other data. The asset tracking device management system 120 may further store travel histories, which may include detailed information collected during the travels of the asset tracking devices, such as motion sensor data, temperature data, speed data, or any other data collected during the trips travelled by the asset tracking devices. The asset tracking device management system 120 includes one or more computing devices, such as a server 122. The server 122 includes a communication interface to communicate with asset tracking devices via one or more computing networks and/or telecommunication networks, including the asset tracking device 130, a memory to store data, and a controller to execute the methods performed by the asset tracking device management system 120 as described herein.

The system 100 further includes the asset tracking device 130. The asset tracking device 130 is installed at an asset 102 to monitor movement of the asset 102. The asset tracking device 130 monitors motion of the asset 102 to determine whether the asset 102 is in travel or at rest. In particular, the asset tracking device 130 monitors the motion sensor data 132 from a motion sensor of the asset tracking device 130 for indications that the asset 102 has begun or finished travel. The asset tracking device 130 is also in communication with the locating system 110 to obtain the location 134 of the asset tracking device 130 when appropriate, and is also in communication with the asset tracking device management system 120 to report the location 134 of the asset tracking device 130 when appropriate.

Example methods by which the asset tracking device 130 determines whether the asset 102 is in travel, and methods by which the asset tracking device 130 determines when to report the location 134 of the asset tracking device 130 to the asset tracking device management system 120, are discussed in greater detail below.

For exemplary purposes, the asset 102 is shown as a transport trailer connected to a transport truck. The transport truck pulls the transport trailer to initiate and cease travel of the transport trailer. In other examples, the asset 102 may include any non-vehicular asset, such as a transport trailer, shipping container, pallet, shipped good, or any other asset which may be tracked by an asset tracking device. In still further examples, the asset 102 may be a vehicular asset, such as a truck, ship, car, or other vehicular asset that may be tracked by an asset tracking device. The asset 102 may be a non-vehicular asset that is coupleable to, connectable to, or otherwise transported with a vehicle, where the vehicle is to control travel of the asset 102 ((e.g., a transport trailer is connectable to a transport truck). Moreover, the asset 102 may be one of several non-vehicular assets that are coupleable to, connectable to, or otherwise transported with a vehicle, such as one of several rail cars pulled by a train, or one of several tethered transport trailers connected to a transport truck.

Figure 2:
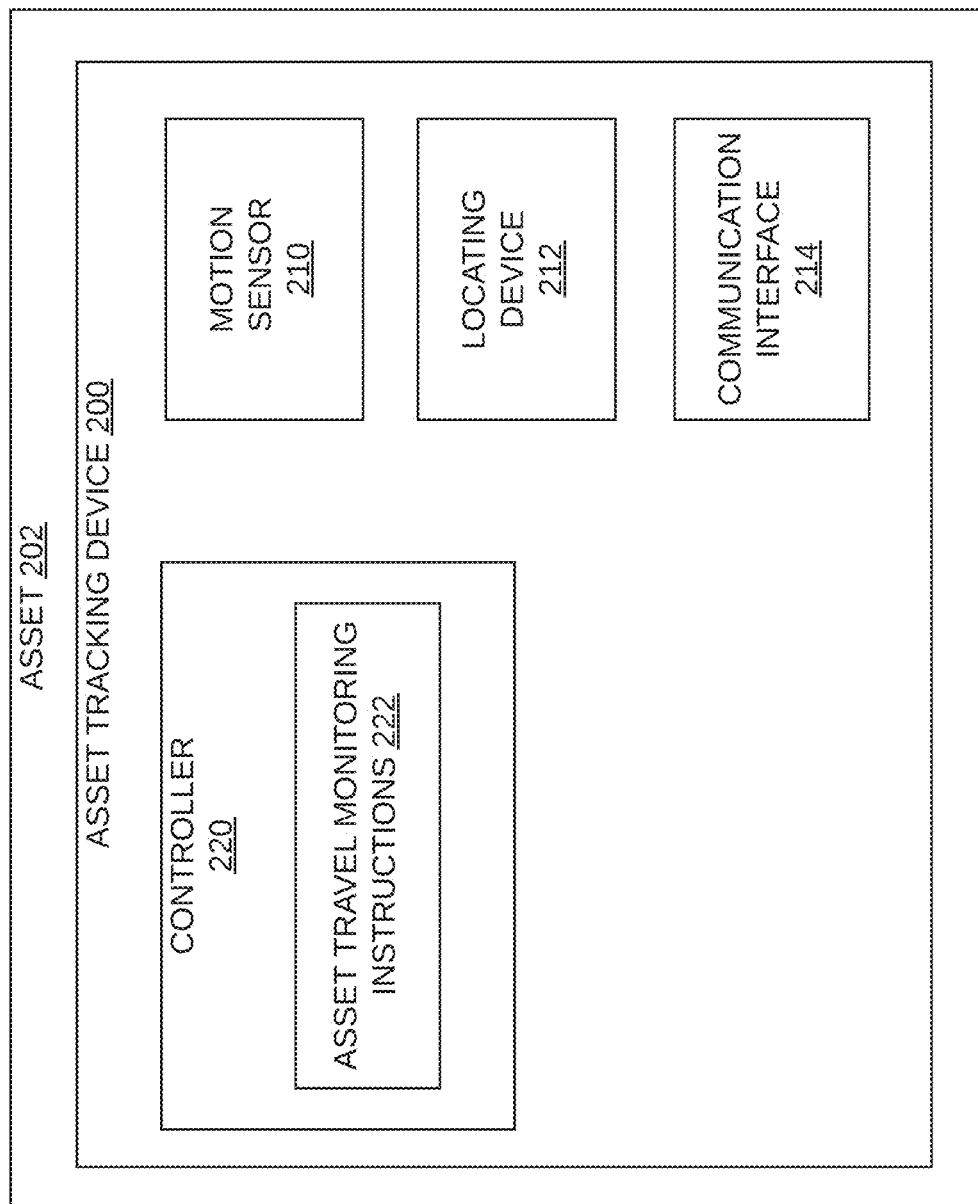
FIG. 2 is a block diagram of an example asset tracking device with motion sensors to determine whether an asset is in travel.

FIG. 2 is a block diagram of an asset tracking device 200, in accordance with example embodiments. The asset tracking device 200 may be similar to the asset tracking device 130 of the system 100 of FIG. 1. The asset tracking device 200 is installed at an asset 202 to monitor travel of the asset 202, which may be similar to the asset 102 of FIG. 1.

The asset tracking device 200 includes a motion sensor 210 to detect motion at the asset tracking device 200. That is, the motion sensor 210 produces motion sensor data, which may be similar to the motion sensor data 132 of FIG. 1. This motion sensor data may include indications that the asset 202 has begun travel and indications that the asset 202 has finished travel. The motion sensor 210 may include an accelerometer, such as a three-axis micro-electromechanical system) MEMS accelerometer (e.g., a LIS3DHTR).

The asset tracking device 200 further includes a locating device 212 to locate the asset tracking device 200. The locating device 212 may include a GPS module, GNSS module (e.g., a U-BLOX ZOE M8G), or other interface to obtain a location from a locating system, such as the locating system 110 of FIG. 1.

The asset tracking device 200 further includes a communication interface 214 to communicate with a remote server, such as the server 122 of the asset tracking device management system 120 of FIG. 1. The communication interface 214 may include a cellular modem, such as a long-term evolution for machines (LTE-M) modem (e.g., QUECTEL BG96 or WNC IMA2A), CAT-M modem, or other cellular modem configured for bidirectional communication via the network with which asset tracking devices may communicate with the asset tracking device management system 120.

The asset tracking device 200 further includes a controller 220. The controller 220 includes one or more of: a processor, a microcontroller unit (MCU), a central processing unit (CPU), microprocessor, processing core, a state machine, a logic gate array, an application-specific integrated circuit (ASIC), a field-programmable gate array (FPGA), or similar, capable of executing, whether by software, hardware, firmware, or a combination of such, the actions performed by the controller 220 as described herein. The controller 220 further includes memory that may include any combination of read-only memory (ROM), random-access memory (RAM), flash memory, magnetic storage, optical storage, and similar, for storing instructions and data as discussed herein, including asset travel monitoring instructions 222.

The controller 220 executes asset travel monitoring instructions 222 to monitor travel of the asset 202. In particular, the asset travel monitoring instructions 222 are executable to cause the controller 220 to monitor the motion sensor 210 to determine whether the asset 202, at which the asset tracking device 200 is located, has entered into a travelling state. That is, the controller 220 monitors motion sensor data from the motion sensor 210 to determine whether the asset 202 has begun travel. Monitoring motion sensor data for indications that the asset 202 may have begun travel may be a more energy efficient way to determine whether the asset 202 has begun travel than by determining whether the asset 202 has begun travel based on location information obtained from a locating system such as a GPS or GNSS system.

Further, upon determination that the asset 202 has entered into the travelling state, the asset travel monitoring instructions 222 cause the controller 220 to monitor the motion sensor 210 to determine whether the asset 202 has left the travelling state. That is, the controller 220 monitors motion sensor data from the motion sensor 210 to determine whether the asset 202 has finished travel. As with determining that the asset 202 may have begun travel, monitoring motion sensor data for indications that the asset 202 may have finished travel may be a more energy efficient way to determine whether the asset 202 has finished travel than obtaining location information from a locating system such as a GPS or GNSS system.

Further, upon determination that the asset 202 has left the travelling state, the asset travel monitoring instructions 222 cause the locating device 212 to obtain a location of the asset tracking device 200, which may be similar to the location 134 of FIG. 1, and cause the communication interface 214 to transmit the location to the remote server. That is, the controller 220 obtains the location of the asset tracking device 200 from a locating system, such as the locating system 110 of FIG. 1, and transmits the location to an asset tracking device management system, such as the asset tracking device management system 120 of FIG. 1. Thus, the energy-costly task of obtaining location information from a locating system and transmitting the location information to an asset tracking device management system may be reserved until a particularly important point in time, namely, when the asset 202 has travelled to a new location.

In some examples, obtaining and transmitting location information may be performed both at the beginning and end of travel. That is, upon determination that the asset has entered into the travelling state, the asset tracking device 200 may obtain its location and transmit its location to an asset tracking device management system. Thus, the energy-costly task of obtaining and transmitting location information is reserved until two particularly important pots in time, namely, when the asset 202 starts travel and when the asset 202 has reached its destination.

The asset tracking device 200 may further include an energy storage unit (not shown) to power the asset tracking device 200. The energy storage unit may include a supercapacitor, which may be particularly useful for its properties of non-toxicity, safe failure, long lifecycle, and its ability to operate in high and low temperatures, which may be particularly desirable in asset tracking devices.

The asset tracking device 200 may further include an energy harvester (not shown) to supply energy to the energy storage unit. The energy harvester may include a solar panel to harvest solar energy, which may be particularly desirable in an asset tracking device which may be located outdoors for extended periods of time.

The asset tracking device 200 may include a housing (not shown) that is designed to resist environmental conditions or other hazardous conditions, including precipitation, wind, dust, debris, water spray, cold and warm weather, or any other adverse condition that may impact the asset tracking device 200 if placed on the exterior of an asset, such as on top of a transport trailer. Further, the housing of the asset tracking device 200 may be designed to fit securely onto the surface of such an asset, such as, for example, between the ribs of a shipping container.

Figure 3:
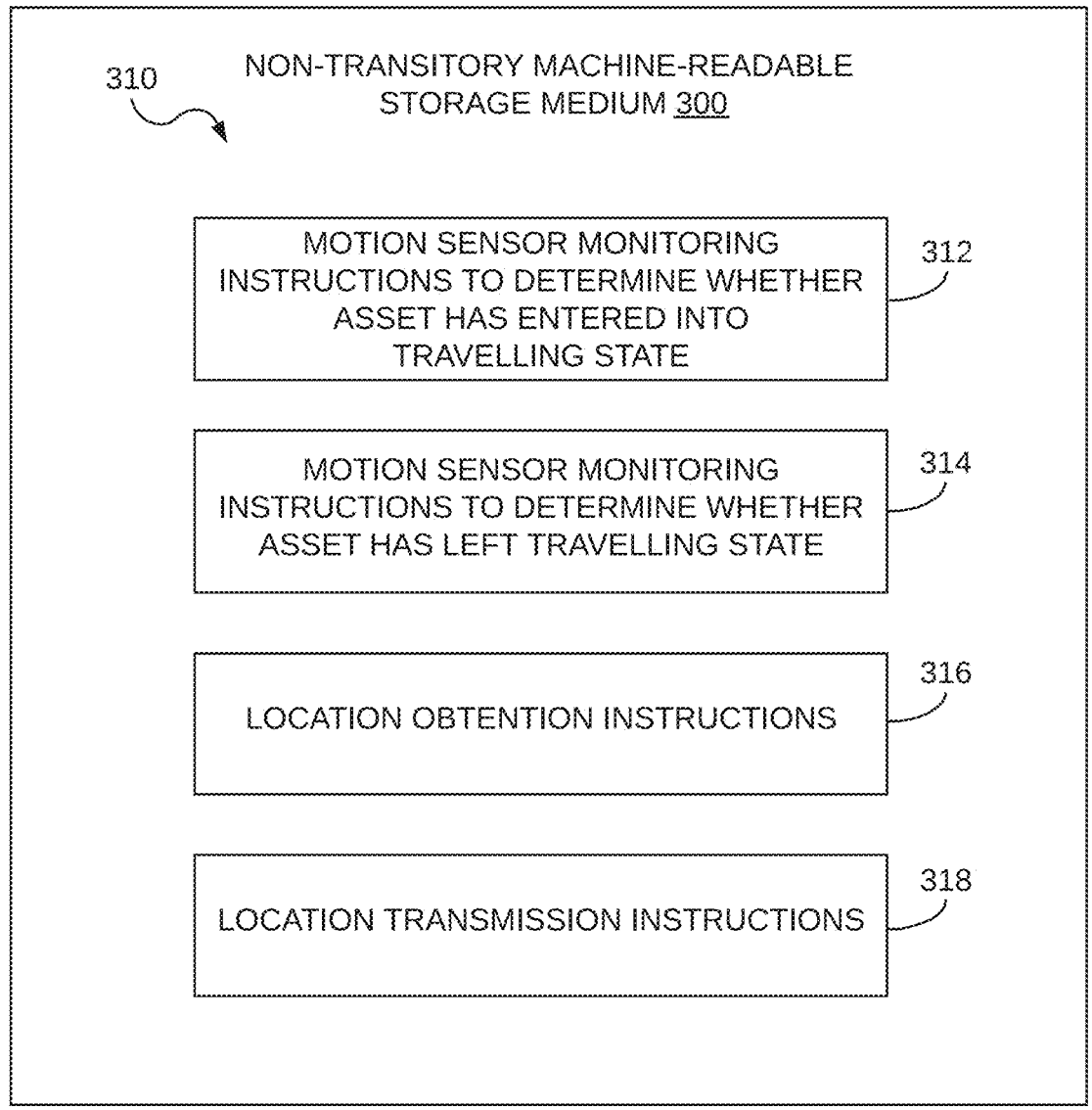
FIG. 3 is a block diagram of an example non-transitory machine-readable storage medium that stores instructions that, when executed, cause a controller of an asset tracking device to execute a method for asset travel monitoring in which motion sensors are used to determine whether an asset is in travel.

FIG. 3 is a block diagram of a non-transitory machine-readable storage medium 300 which stores asset travel monitoring programming instructions 310, in accordance with example embodiments. The non-transitory machine-readable storage medium 300 may be understood to be any medium which can store the asset travel monitoring programming instructions 310 to be executable by a processor of a computing device, such as, for example, the controller 220 of FIG. 2. The asset travel monitoring programming instructions 310 may be similar to the asset travel monitoring instructions 222 of FIG. 2, and thus for convenience, the asset travel monitoring programming instructions 310 are described with reference to the asset tracking device 200 of FIG. 2. However, it is to be understood that the asset travel monitoring programming instructions 310 may be executed by another system or device.

Thus, the asset travel monitoring programming instructions 310 include motion sensor monitoring instructions 312 to monitor the motion sensor 210 to determine whether the asset 202 has entered into a travelling state. The asset travel monitoring programming instructions 310 further include motion sensor monitoring instructions 314 to, upon determination that the asset 202 has entered into the travelling state, monitor the motion sensor 210 to determine whether the asset 202 has left the travelling state. The asset travel monitoring programming instructions 310 further include location obtention instructions 316 to, upon determination that the asset 202 has left the travelling state, obtain a location of the asset tracking device 200. The asset travel monitoring programming instructions 310 further include location transmission instructions 318 to transmit the location to a remote server.

As described above, the asset travel monitoring programming instructions 310 may be similar to the asset travel monitoring instructions 222 executable by the controller 220 of FIG. 2 to monitor travel of the asset 202.

Figure 4:
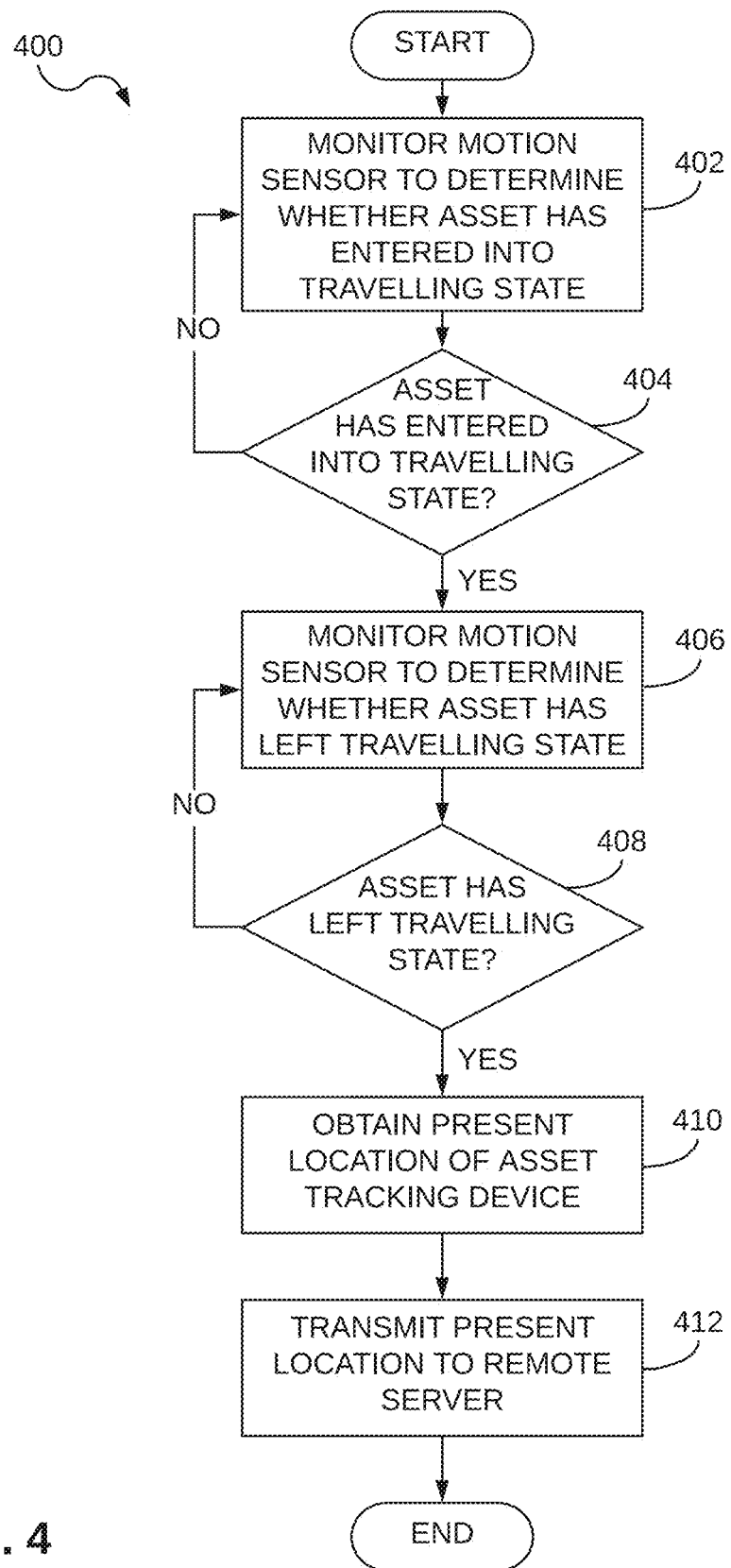
FIG. 4 is a flowchart of an example method for asset travel monitoring in which motion sensors are used to determine whether an asset is in travel.

FIG. 4 is a flowchart of a method 400 for asset travel monitoring, in accordance with an example embodiment. The method 400 may be similar to a method performed by the controller 220 upon execution of the asset travel monitoring instructions 222. Thus, for convenience, the method 400 is described with reference to the asset tracking device 200. However, it is to be understood that the method 400 may be performed by other systems or devices.

At block 402, the controller 220 monitors the motion sensor 210 to determine whether the asset 202 has entered into a travelling state. An example method for determining whether an asset has entered into a travelling state is provided in FIG. 5, below. At block 404, where it is determined that the asset 202 has entered into the travelling state, the method 400 proceeds to block 406. Where it is not determined that the asset 202 has entered into the travelling state, the method 400 returns to block 402 for continued monitoring.

In some examples, upon determination that the asset 202 has entered into the travelling state, the locating device 212 may obtain its location, and the communication interface 214 may transmit the location of the asset tracking device 200 at the beginning of travel (i.e., the travel beginning location), to the remote server.

At block 406, upon determination that the asset 202 has entered the travelling state, the controller 220 monitors the motion sensor 210 to determine whether the asset 202 has left the travelling state. An example method for determining whether an asset has left a travelling state is provided in FIG. 7, below. At block 408, where it is determined whether the asset 202 has left the travelling state, the method 400 proceeds to block 410. Where it is not determined that the asset 202 has left the travelling state, the method 400 returns to block 406 for continued monitoring.

At block 410, upon determination that the asset 202 has left the travelling state, the locating device 212 obtains the location of the asset tracking device 200. Further, at block 412, the communication interface 214 transmits the location of the asset tracking device 200 to a remote server. An example method for obtaining and transmitting the location of an asset tracking device is provided in FIG. 10, below.

As described above, the method 400 may be similar to a method performed by the controller 220 of FIG. 2 upon execution of the asset travel monitoring instructions 222 to monitor travel of the asset 202.

Figure 5:
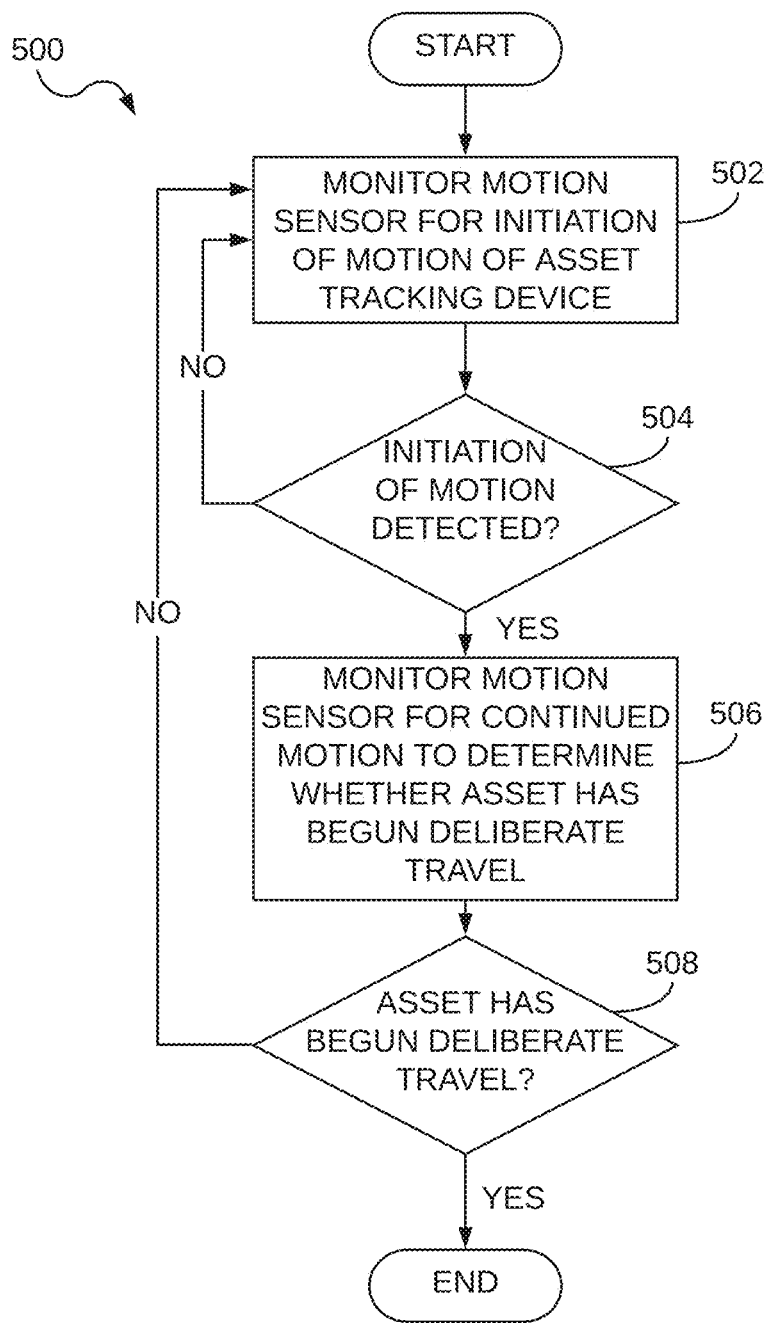
FIG. 5 is a flowchart of an example method for determining whether an asset has entered into a travelling state.

FIG. 5 is a flowchart of a method 500 for determining whether an asset has entered into a travelling state, in accordance with example embodiments. The method 500 may be understood to be one example of a way in which the block 402 of the method 400 of FIG. 4 may be performed. Thus, for convenience, the method 500 is described with reference to the asset tracking device 200 of FIG. 2, but this is not limiting, and the method 500 may be performed by other devices or systems.

At block 502, the controller 220 monitors the motion sensor 210 for initiation of motion of the asset tracking device 200. That is, the controller 220 monitors motion sensor data from the motion sensor 210 for an initial or preliminary indication that the asset 202 may have begun travel. An example of motion sensor data that includes a preliminary indication that an asset may have begun travel is provided in FIG. 6, below. At block 504, where an indication of initiation of motion is detected, the method 500 proceeds to block 506. Where no indication of initiation of motion is detected, the method 500 returns to block 502 for continued monitoring.

At block 506, the controller 220 monitors the motion sensor 210 for continued motion to determine whether the asset 202 has begun deliberate travel (i.e., substantial, purposeful, intentional, or directed travel). That is, the controller 220 continues to monitor the motion sensor data 132 from the motion sensor 210 to determine whether the initial or preliminary indication of motion is followed by further indication that the asset 202 has actually begun travel, and that the initial indication of motion is not a false positive. An example of motion sensor data that includes further indication that an asset is in deliberate travel is provided in FIG. 6, below. At block 508, where it is determined that the asset 202 has begun deliberate travel, the method 500 is ended. Where it is not determined that the asset 202 has begun travel, the method 500 returns to block 502 for continued monitoring.

Figure 6:
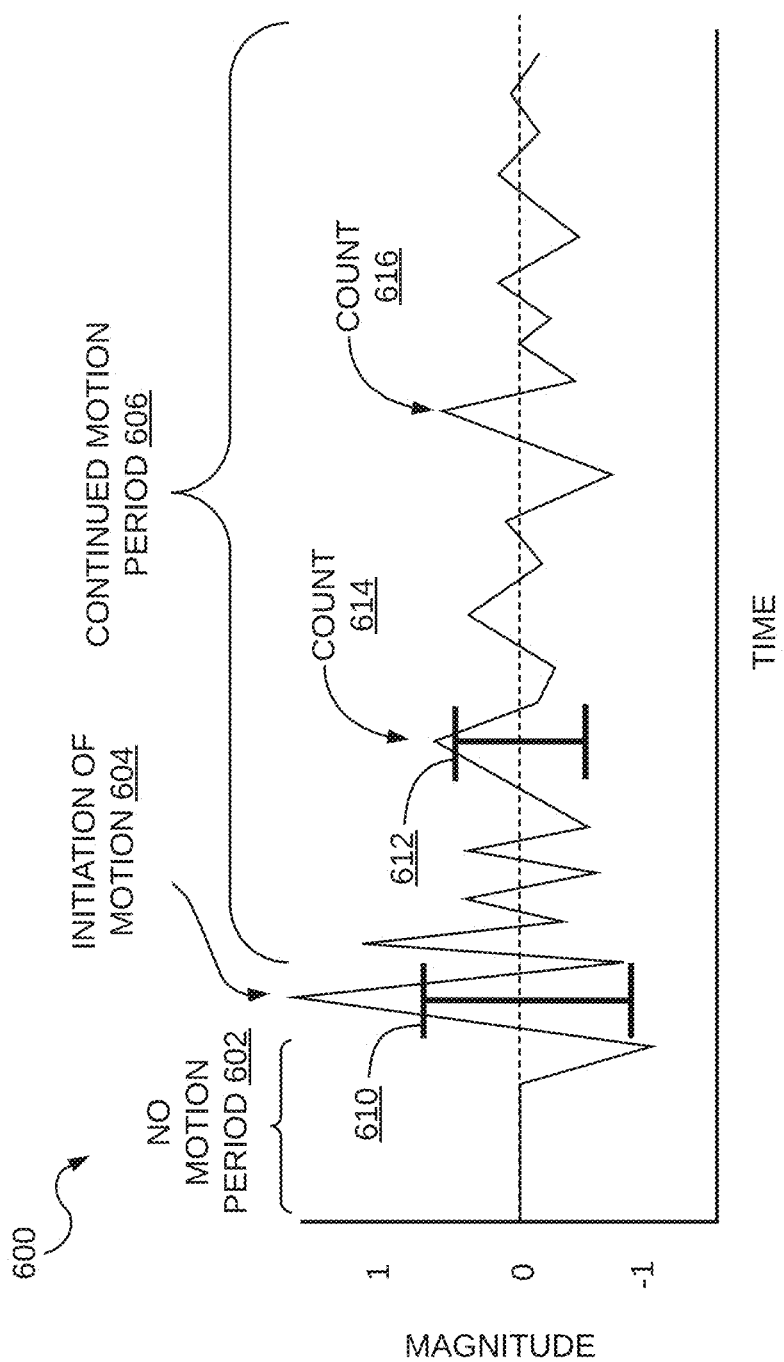
FIG. 6 is motion sensor data plot showing example motion sensor data from an asset tracking device that indicates that an asset being monitored by the asset tracking device has entered into a travelling state.

FIG. 6 is a plot that shows motion sensor data 600, in accordance with example embodiments. The motion sensor data 600 may be similar to the motion sensor data 132 shown in FIG. 1, which may be monitored by the controller 220 of FIG. 2, and thus, for convenience, description of the motion sensor data 600 is made with reference to the asset tracking device 200 of FIG. 2.

The motion sensor data 600 includes an indication of initiation of motion of the asset 202, and further includes an indication that the asset 202 has begun deliberate travel. For example, the motion sensor data 600 is shown as a measurement of a magnitude of motion sensor data from the motion sensor 210, measured in arbitrary units between −1 and +1, over arbitrary units of time.

The motion sensor data 600 includes a period 602 during which the motion sensor 210 indicates substantially no motion at the asset tracking device 200. That is, the magnitude of the motion sensor data 600 during the period 602 is substantially zero. The controller 220 may periodically read the motion sensor data 600 to determine whether the magnitude of the motion sensor data 600 remains substantially near zero.

The motion sensor data 600 may appear to be substantially zero where, for example, the asset tracking device 200 is located on a vehicular asset that is at rest (e.g., the asset 202 is a land vehicle that is parked or stopped), or where the asset tracking device 200 is located on a non-vehicular asset that is at rest (e.g., the asset 202 is a transport trailer or shipping container that is in storage, or that is connected to a vehicle that is at rest).

The motion sensor data 600 further includes an instant or period 604 during which initiation of motion at the asset tracking device 200 is detected. That is, the magnitude of the motion sensor data 600 during the instant or period 604 is greater than a first threshold 610. In some examples, the motion sensor 210 may be configured to alert the controller 220 when a magnitude of the motion sensor data 600 is detected above the first threshold 610, and in other examples, the motion sensor 210 may periodically read the magnitude of the motion sensor data 600 to determine whether the magnitude of the motion sensor data 600 exceeds the first threshold 610. When the magnitude of the motion sensor data 600 exceeds the first threshold 610, block 504 of the method 500 of FIG. 5 may be satisfied, as the initiation of motion of the asset tracking device 200 is detected.

The motion sensor data 600 may surpass the first threshold 610 where, for example, the asset tracking device 200 is located on a vehicular asset that begins to travel (e.g., the asset 202 is a land vehicle that begins to move from a parked or stopped position into a travelling state), or where the asset tracking device 200 is located on a non-vehicular asset that beings to travel (e.g., the asset 202 is a transport trailer or shipping container that is moved from storage to being on or connected to a vehicle, or the asset 202 is on or connected to a vehicle that begins motion).

However, the preliminary indication that the asset 202 may have begun travel may be a false positive. Thus, the controller 220 continues to monitor the motion sensor data 600 for a period 606 during which continued motion at the asset tracking device 200 may be detected, which may be taken to indicate that the asset 202 has begun deliberate motion. In other words, the motion sensor data 600 is monitored to determine that the initial indication of motion is not a false positive (e.g., motion caused by a vehicle door closing, or by environmental factors such as wind).

Continued motion during the period 606 may be determined if the magnitude of the motion sensor data 600 exceeds a second threshold 612 a predetermined number of occurrences (indicated as counts 614, 616) within a predetermined duration. A series of subsequent occurrences in which the second threshold 612 is exceeded may indicate that the asset 202, whether a vehicular asset or a non-vehicular asset on or connected to a vehicular asset, is undergoing starts, stops, turns, bumps in the road, and other forms of motion that are indicative of deliberate travel.

Once triggered by detection of the initiation of motion, in some examples, the motion sensor 210 may be configured to alert the controller 220 when the magnitude of the motion sensor data 600 exceeds the second threshold 612, and in other examples, the controller 220 may periodically read the magnitude of the motion sensor data 600 to determine whether the magnitude of the motion sensor data 600 exceeds the second threshold.

When there are a sufficient number of occurrences during which the magnitude of the motion sensor data 600 exceeds the second threshold 612, block 508 of the method 500 of FIG. 5 may be satisfied, as continued motion indicative of deliberate travel of the asset 202 is detected. Continued indications of motion at the asset tracking device 200 may indicate that the asset 202 is in deliberate motion and that the initial indication of motion was not a false positive.

The first threshold 610 and the second threshold 612, may be predetermined, and may be set based on the type of asset tracking device 200, type of asset 202, the asset tracking device 200, the asset 202, and/or other factors that may influence how the motion sensor data 600 is indicative of the initiation of motion or of continued motion of the asset 202. The second threshold 612 may be equal to, greater than, or less than, the first threshold 610. Similarly, the duration during which indications of continued motion are monitored may be predetermined, and may be based on the type of asset tracking device 200, type of asset 202, the asset tracking device 200, the asset 202, and/or other factors that may influence how the motion sensor data 600 is indicative of the initiation of motion or of continued motion of the asset 202.

Figure 7:
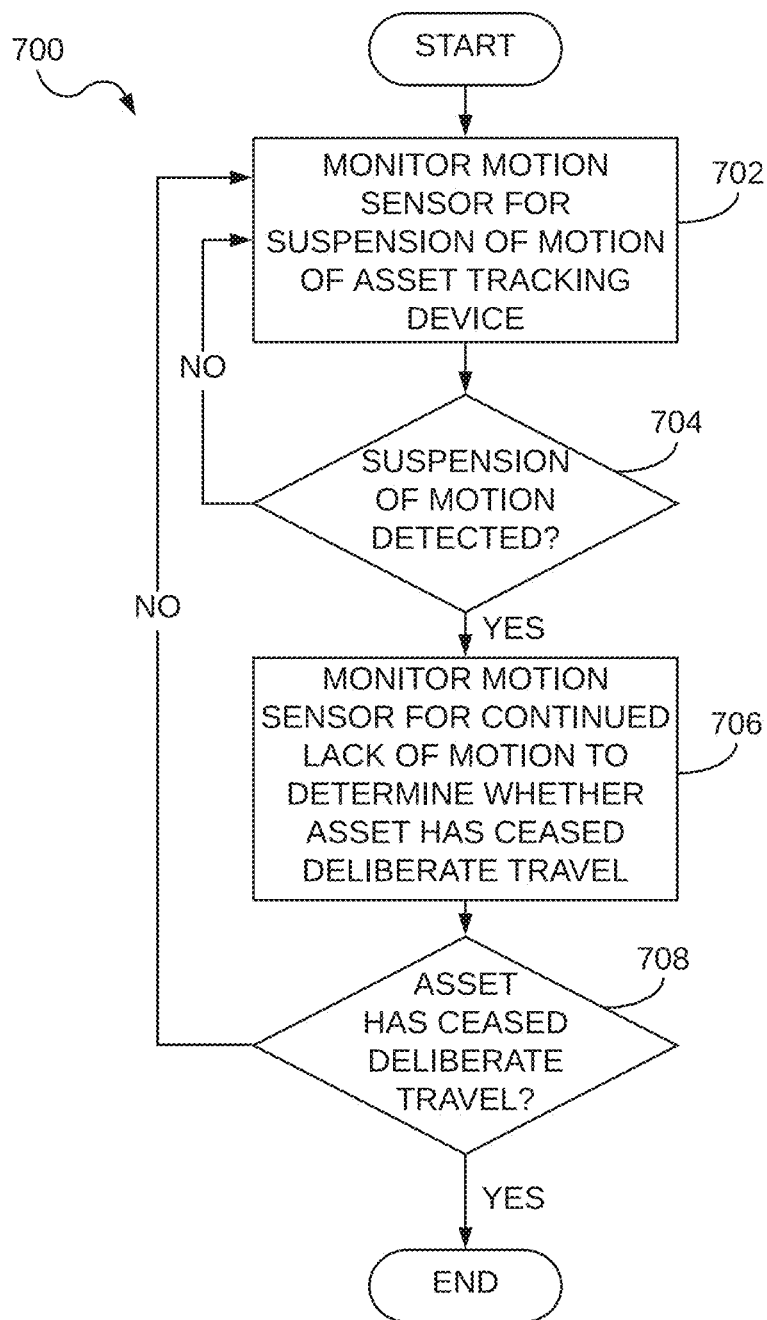
FIG. 7 is a flowchart of an example method for determining whether an asset has left a travelling state.

FIG. 7 is a flowchart of a method 700 for determining whether an asset has left a travelling state, in accordance with example embodiments. The method 700 may be understood to be one example of a way in which the block 406 of the method 400 of FIG. 4 may be performed. Thus, for convenience, the method 700 is described with reference to the asset tracking device 200 of FIG. 2, but this is not limiting, and the method 700 may be performed by other devices or systems.

At block 702, the controller 220 monitors the motion sensor 210 for suspension of motion of the asset tracking device 200. That is, the controller 220 monitors motion sensor data from the motion sensor 210 for an initial or preliminary indication that the asset 202 may have finished travel. An example of motion sensor data that includes a preliminary indication that an asset may have finished travel is provided in FIG. 8, below. At block 704, where an indication of suspension of motion is detected, the method 700 proceeds to block 706. Where no indication of suspension of motion is detected, the method 700 returns to block 702 for continued monitoring.

At block 706, the controller 220 monitors the motion sensor 210 for continued lack of motion to determine whether the asset 202 has ceased deliberate travel. That is, the controller 220 continues to monitor motion sensor data from the motion sensor 210 to determine whether the initial or preliminary indication of suspension of motion is followed by further indication that the asset 202 has finished deliberate travel. In other words, the controller 220 determines that the initial indication of suspension of motion is not a false positive. An example of motion sensor data that includes further indication that an asset has ceased deliberate travel is provided in FIG. 8, below. At block 708, where it is determined that the asset 202 has ceased deliberate travel, the method 700 is ended. Where it is not determined that the asset 202 has ceased travel, the method 700 returns to block 702 for continued monitoring.

Figure 8:
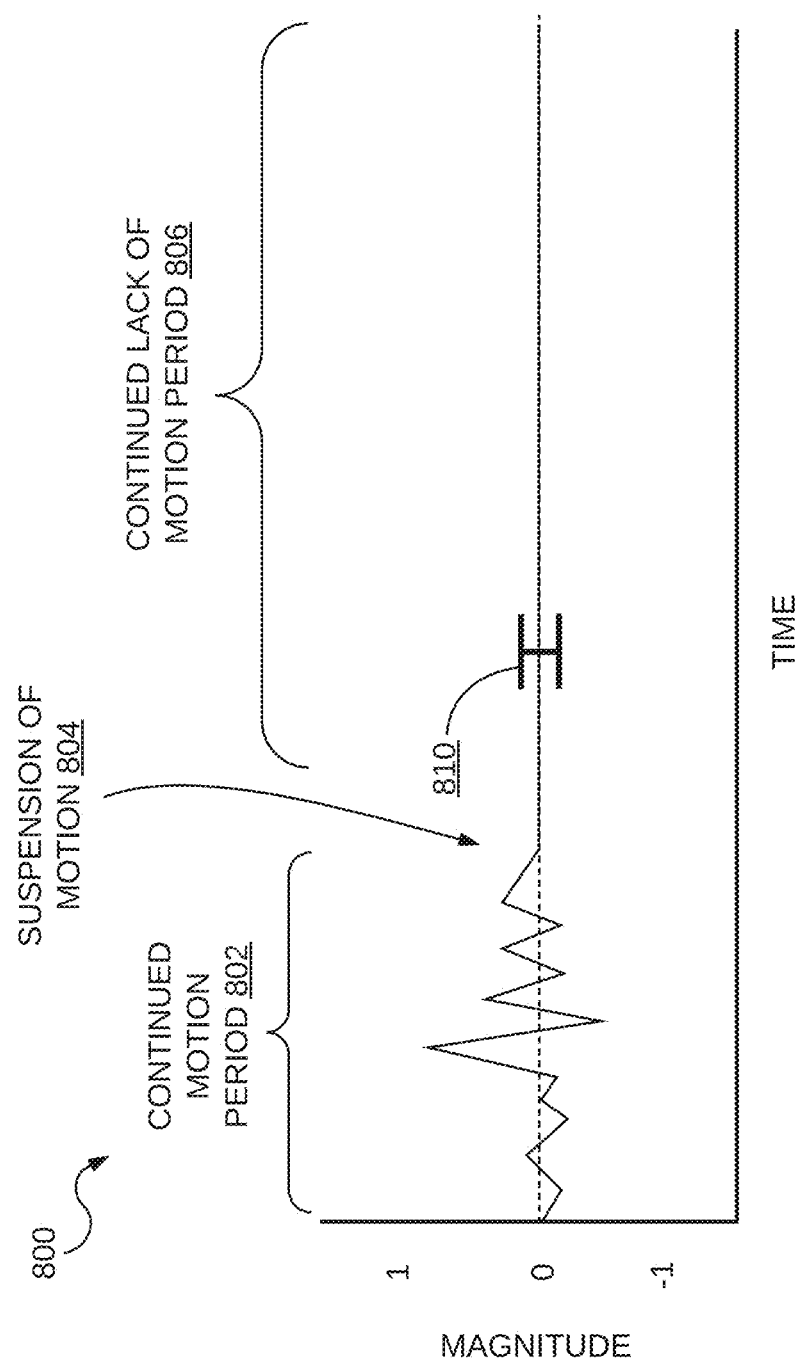
FIG. 8 is a motion sensor data plot showing example motion sensor data from an asset tracking device that indicates that an asset being monitored by the asset tracking device has left a travelling state.

FIG. 8 illustrates motion sensor data 800, in accordance with example embodiments. The motion sensor data 800 may be similar to the motion sensor data monitored by the controller 220 of FIG. 2, and thus, for convenience, description of the motion sensor data 800 is made with reference to the asset tracking device 200 of FIG. 2.

The motion sensor data 800 includes an indication of suspension of motion of the asset 202, and further includes an indication that the asset 202 has ceased deliberate travel. For example, the motion sensor data 800 is shown as a measurement of a magnitude of motion sensor data from the motion sensor 210, measured in arbitrary units between −1 and +1, over arbitrary units of time.

The motion sensor data 800 includes a period 802 during which the motion sensor 210 indicates continued motion at the asset tracking device 200. That is, the magnitude of the motion sensor data 800 during the period 802 is substantially greater than zero.

The motion sensor data 800 may appear to be substantially greater than zero where, for example, the asset tracking device 200 is located on a vehicular asset that is in motion (e.g., the asset 202 is a land vehicle that is driving), or where the asset tracking device 200 is located on a non-vehicular asset that is in motion (e.g., the asset 202 is a transport trailer or shipping container that is on or connected to a vehicle that is driving).

The motion sensor data 800 further includes an instant or period 804 during which suspension of motion at the asset tracking device 200 takes place. That is, the magnitude of the motion sensor data 800 during the instant or period 804 is below a third threshold 810. In some examples, the motion sensor 210 may be configured to alert the controller 220 when the magnitude of the motion sensor data 800 falls beneath the third threshold 810, and in other examples, the controller 220 may periodically read the motion sensor data 800 to determine whether the magnitude of the motion sensor data 800 is beneath the third threshold 810. When the magnitude of the motion sensor data 800 falls below the third threshold 810, block 704 of the method 700 of FIG. 5 may be satisfied, as the suspension of motion of the asset tracking device 200 is detected.

The motion sensor data 800 may fall beneath the third threshold 810 where, for example, the asset tracking device 200 is located on a vehicular asset that stops moving (e.g., the asset 202 is a land vehicle that stops travelling for either a brief period or an extended duration), or where the asset tracking device 200 is located on a non-vehicular asset that stops moving (e.g., the asset 202 is a transport trailer or shipping container that is connected to a vehicle that stops travelling).

However, the preliminary indication that the asset 202 may have ceased travel may be a false positive. Thus, the controller 220 may continue to monitor the motion sensor data 800 for a period 806 during which continued lack of motion at the asset tracking device 200 may be detected, which may be taken to indicate that the asset 202 has ceased deliberate motion. The motion sensor data 800 being beneath the third threshold 810 for an extended duration may indicate that the asset 202, whether a vehicular asset or a non-vehicular asset on or connected to a vehicular asset, has stopped for an extended period of time (e.g., parked or entered into storage), as opposed to having merely suspended motion temporarily.

Continued lack of motion during the period 806 may be determined if the magnitude of the motion sensor data 600 remains beneath the third threshold 810 for a predetermined duration. In some examples, the motion sensor 210 may be configured to alert the controller 220 when the magnitude of the motion sensor data 800 falls beneath the third threshold 810, and in other examples, the controller 220 may periodically read the motion sensor data 800 to determine whether the magnitude of the motion sensor data 800 is beneath the third threshold 810.

When the magnitude of the motion sensor data 800 remains beneath the third threshold 810 for a predetermined duration, block 708 of the method 700 of FIG. 7 may be satisfied, as continued lack of motion indicative of cessation of deliberate travel of the asset 202 is detected. Continued indications of lack of motion at the asset tracking device 200 may indicate that the asset 202 has ceased deliberate motion and that the initial indication of suspension of motion was not a false positive.

The first threshold 610, the second threshold 612, and the third threshold 810 may be predetermined, and may be set based on the type of asset tracking device 200, type of asset 202, the asset tracking device 200, the asset 202, and/or other factors that may influence how the motion sensor data 600 and/or 800 are indicative of the initiation of motion, continued motion, suspension of motion, and/or continued lack of motion of the asset 202. The third threshold 810 may be equal to, greater than, or less than, the first threshold 610 and/or the second threshold 612. Similarly, the duration during which indications of continued lack of motion are monitored may be predetermined, and may be based on the type of asset tracking device 200, type of asset 202, the asset tracking device 200, the asset 202, and/or other factors that may influence how the motion sensor data 600 is indicative of continued lack of motion of the asset 202.

Figure 9:
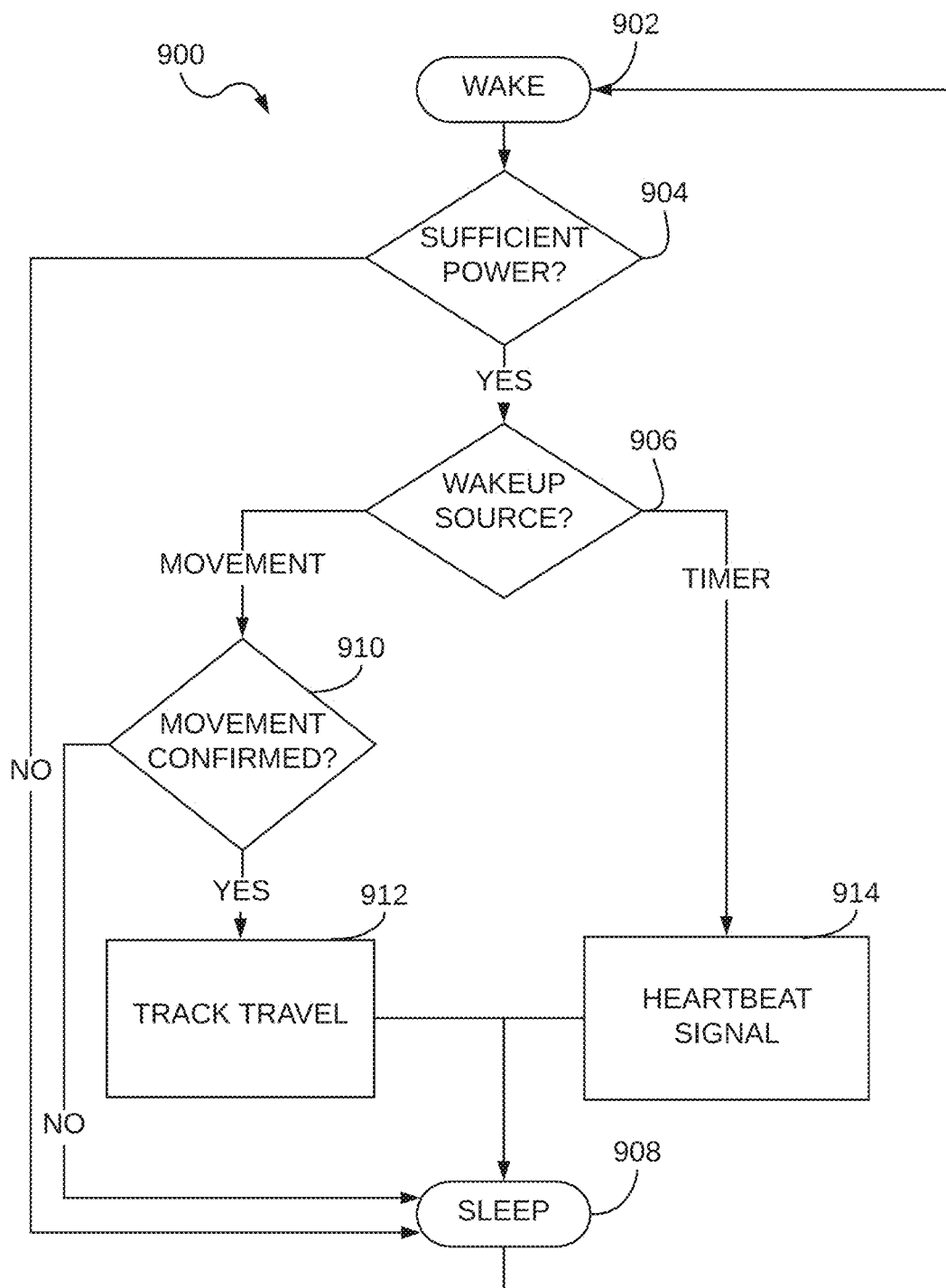
FIG. 9 is a state diagram of an example process for operating an asset tracking device.

FIG. 9 is a state diagram of a process 900 for operating an asset tracking device, in accordance with example embodiments. The process 900 may be employed by the asset tracking device 200 to monitor travel of the asset 202. Thus, for convenience, the process 900 will be described with reference to the asset tracking device 200 of FIG. 2. However, this is not limiting, and the process 900 may be employed by other systems or devices.

At the outset of the process 900, the controller 220, the locating device 212, and the communication interface 214 may each be operating in a low-power (i.e., "sleep") mode that conserves energy. At block 902, the controller 220 wakes from its low-power operating mode by some wakeup source or triggering event.

At block 904, the controller 220 determines whether the asset tracking device 200 has access to sufficient power to carry out further steps of the process 900, which involve determining the wakeup source and taking follow-on actions. Where it is determined that the asset tracking device 200 does not have access to sufficient power, the controller 220 is returned to its low-power operating mode at block 908. The asset tracking device 200 may gain access to sufficient power to proceed with the process 900 at a later time, such as, for example, by an energy source of the asset tracking device 200 being charged.

Where it is determined that the asset tracking device 200 has sufficient power to carry out further steps of the process 900, the controller 220 determines the reason for the controller 220 waking (i.e., the "wakeup source") at block 906. The wakeup source may be either a timer which periodically wakes the controller 220 or an indication of movement at the asset tracking device 200.

Where the wakeup source is movement of the asset tracking device 200, the controller 220 attempts to confirm that the detected movement is indicative of deliberate travel of the asset 202 at block 910. For example, the controller 220 may execute the method 500 of FIG. 5 to determine whether the asset tracking device 200 has begun deliberate travel.

Where it is determined that the asset 202 has begun deliberate travel, the controller 220 continuously tracks the travel of the asset 202 at block 912. For example, the controller 220 may execute the method 700 of FIG. 7 to determine when the asset tracking device 200 finishes travel. When tracking the travel of the asset 202 is complete, the controller 220 returns to its low-power operating mode at block 908. Where it is not determined that the asset 202 has begun deliberate travel, the controller 220 is returned to its low-power operating mode at block 908.

Where the wakeup source is a timer, the controller 220 causes a heartbeat signal to be transmitted to a remote server to indicate that the asset tracking device 200 is active, at block 914. After the heartbeat signal is sent, the controller 220 returns to its low-power operating mode at block 908. The timer may be set to wake the controller 220 to transmit a heartbeat signal on a periodic basis, such as, for example, once or twice per day.

Thus, the asset tracking device 200 may be operated in a low-power operating mode for energy conservation, waking only to track movement of the asset 202 or to transmit a heartbeat signal to a remote server.

Figure 10:
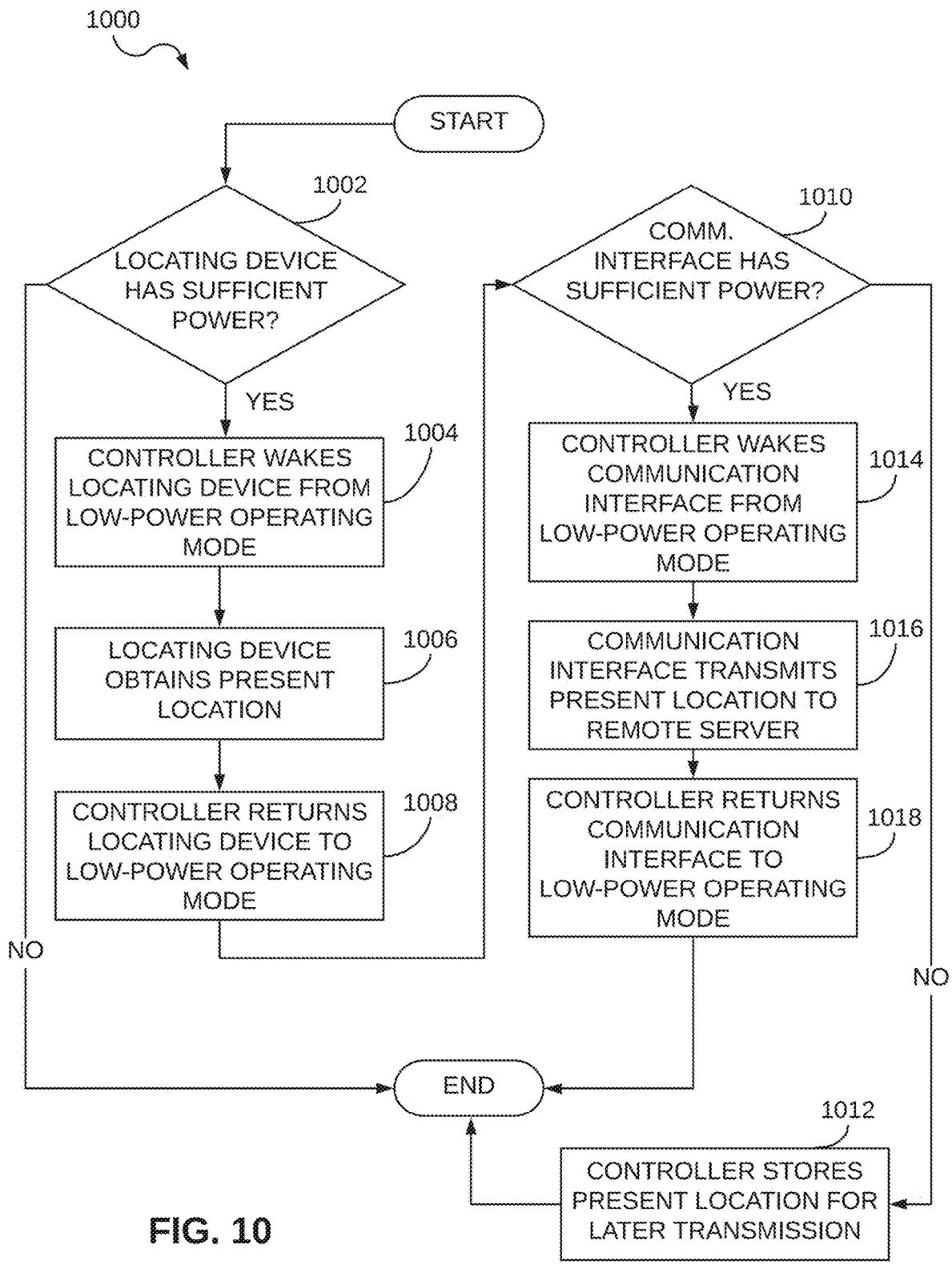
FIG. 10 is a flowchart of an example method for obtaining and transmitting a location of an asset tracking device to a remote server.

FIG. 10 is a flowchart of a method 1000 for obtaining and transmitting a location of an asset tracking device to an asset tracking device management system, in accordance with example embodiments. The method 1000 may be performed by the asset tracking device 200 while monitoring travel of the asset 202, and thus for convenience, the method 1000 will be described with reference to the asset tracking device 200 of FIG. 2. However, this is not limiting, and the method 1000 may be followed by other systems or devices.

As discussed above with reference to FIG. 9, the asset tracking device 200 may be operated with the controller 220, the locating device 212, and the communication interface 214 operating in low-power modes that conserve energy. By the method 1000, these components may be selectively awakened from their low-power operating modes when instructed to perform a given action, and returned to their low-power operating modes to continue to conserve energy.

At block 1002, the controller 220 determines whether the locating device 212 has access to sufficient power to obtain the present location of the asset tracking device 200. Where it is not determined that the locating device 212 has access to sufficient power, the method 1000 is ended. Where it is determined that the locating device 212 has access to sufficient power, the method 1000 proceeds to block 1004.

At block 1004, the controller 220 wakes the locating device 212 from its low-power operating mode. At block 1006, the locating device 212 obtains the present location of the asset tracking device 200. At block 1008, the controller 220 returns the locating device 212 to its low-power operating mode.

At block 1010 the controller 220 determines whether the communication interface 214 has access to sufficient power to transmit the present location of the asset tracking device 200 to a remote server. Where it is not determined that the communication interface 214 has access to sufficient power, the method 1000 proceeds to block 1012, where the controller 220 stores the present location for later transmission to the remote server. Where it is determined that the communication interface 214 has sufficient power, the controller 220 wakes the communication interface 214 from its low-power operating mode, and the method 1000 proceeds to block 1016.

At block 1016, the communication interface 214 transmits the present location of the asset tracking device 200 to the remote server. At block 1018, the controller 220 returns the communication interface 214 to its low-power operating mode.

Thus, as described above, it can be seen that an asset tracking device may operate its components in low-power operating modes, and may use energy-efficient methods to determine whether the asset that it is tracking is beginning or finishing travel. An asset tracking device may sparingly report the location of the asset to an asset tracking device management system only at the appropriate times and under the appropriate circumstances in order to conserve energy.

As described below, the energy capacity and lifecycle of an asset tracking device with an on-board energy storage unit may be improved by employing temperature-dependent charging of the energy storage unit. Temperature-dependent charging of an energy storage unit may be particularly applicable where the energy storage unit includes a supercapacitor, which the life cycles of which may be impacted when charged to different voltages at different temperatures. In many cases, a supercapacitor, when used as an energy storage unit, may be charged below capacity (e.g., at 80% of capacity) as a heuristic to reduce the deterioration of the lifecycle of the supercapacitor under adverse temperature conditions. However, such techniques are often based on predetermined rules which are not temperature-dependent, and which often do not allow the supercapacitor to be utilized to its full capacity under a given temperature condition. As described herein, a supercapacitor may be charged to a target voltage that is determined to balance utilization of the capacity of the supercapacitor against temperature-dependent deterioration of the supercapacitor.

Figure 11:
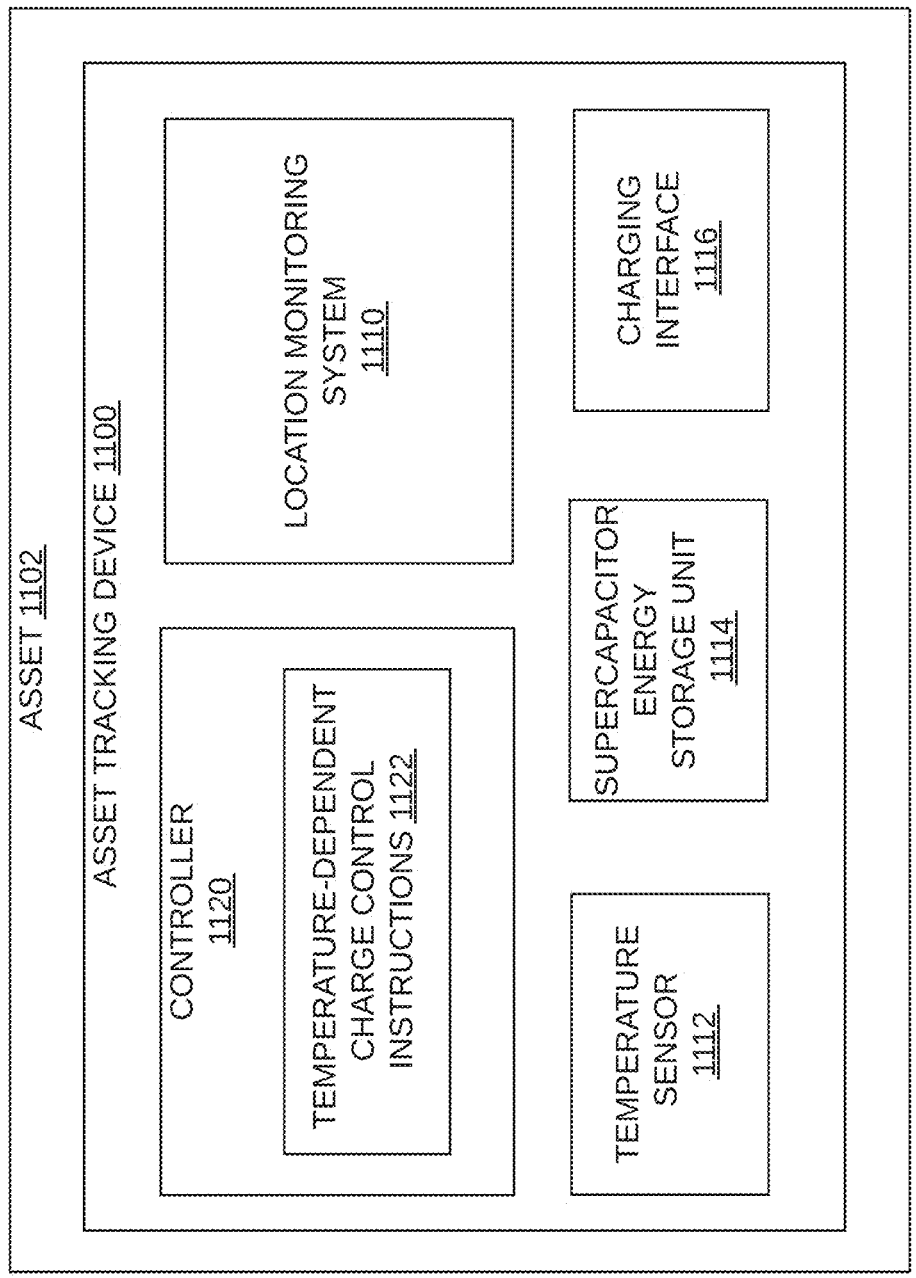
FIG. 11 is a block diagram of an example asset tracking device with temperature-dependent charging.

FIG. 11 is a block diagram of an asset tracking device 1100 with temperature-dependent charging of a supercapacitor energy storage unit, in accordance with example embodiments. The asset tracking device 1100 may be similar to the asset tracking device 200 of FIG. 2, and thus, may be located at an asset 1102 similar to the asset 202 of FIG. 2.

The asset tracking device 1100 includes a location monitoring system 1110 to track the location of the asset tracking device 1100. The location monitoring system 1110 may include a motion sensor, locating device, and communication interface, similar to the motion sensor 210, locating device 212, and communication interface 214 of the asset tracking device 200 of FIG. 2. However, this is not limiting, and the location monitoring system 1110 may include other components and employ other techniques for monitoring location.

The asset tracking device 1100 further includes a supercapacitor energy storage unit 1114 to power the asset tracking device 1100. The supercapacitor energy storage unit 1114 includes one or more supercapacitors, such as an electric double layer capacitor (EDLC) supercapacitor.

The asset tracking device 1100 further includes a temperature sensor 1112 to capture temperature readings at the asset tracking device 1100. The temperature sensor 1112 may be located near the supercapacitor energy storage unit 1114 to measure an ambient temperature near the supercapacitor energy storage unit 1114. The asset tracking device 1100 further includes a charging interface 1116 to charge the supercapacitor energy storage unit 1114.

The asset tracking device 1100 further includes a controller 1120 to execute temperature-dependent charge control instructions 1122 to control the charging interface 1116 to charge the supercapacitor energy storage unit 1114 in a temperature-dependent manner. The controller 1120 is similar to the controller 220 of FIG. 2, and thus may include one or more of: a processor and a similar component, and memory, as described above, to execute the temperature-dependent charge control instructions 1122, and to perform other actions, such as control of the location monitoring system 1110.

The temperature-dependent charge control instructions 1122 are executable to cause the controller 1120 to obtain a temperature reading measured at the asset tracking device 1100. The temperature reading may have been measured by the temperature sensor 1112. The temperature reading may be the most recent temperature reading measured by the temperature sensor 1112. In some examples, the temperature-dependent charge control instructions 1122 may cause the controller 1120 to obtain one or more previously measured temperature readings measured at the asset tracking device 1100.

The temperature-dependent charge control instructions 1122 further cause the controller 1120 to determine a target voltage for the supercapacitor energy storage unit 1114 based on the temperature reading (and/or any previously measured temperature readings). A supercapacitor exhibits a predictable relationship (a substantially quadratic relationship) between voltage and energy storage, and thus the voltage held by a supercapacitor is an indication of the amount of energy stored in the supercapacitor.

The target voltage is determined to balance utilization of the capacity of the supercapacitor energy storage unit 1114 against temperature-dependent deterioration of the supercapacitor energy storage unit 1114. That is, the target voltage is selected so that the supercapacitor energy storage unit 1114 is charged to the highest safe voltage without significant deterioration of the lifecycle of the supercapacitors thereof. The target voltage may be determined based on a supercapacitor degradation model of the supercapacitor energy storage unit 1114, for example, as described in FIG. 14, below.

The temperature-dependent charge control instructions 1122 further cause the controller 1120 to control the charging interface 1116 to charge the supercapacitor energy storage unit 1114 to the target voltage. That is, the supercapacitor energy storage unit 1114 is charged up to the target voltage, and no further.

Thus, the supercapacitor energy storage unit 1114 may be charged to a voltage that utilizes a significant portion of the capacity of the supercapacitor energy storage unit 1114 without overcharging to a point that would be unduly detrimental to the lifecycle of a supercapacitors at the given temperature reading.

Figure 12:
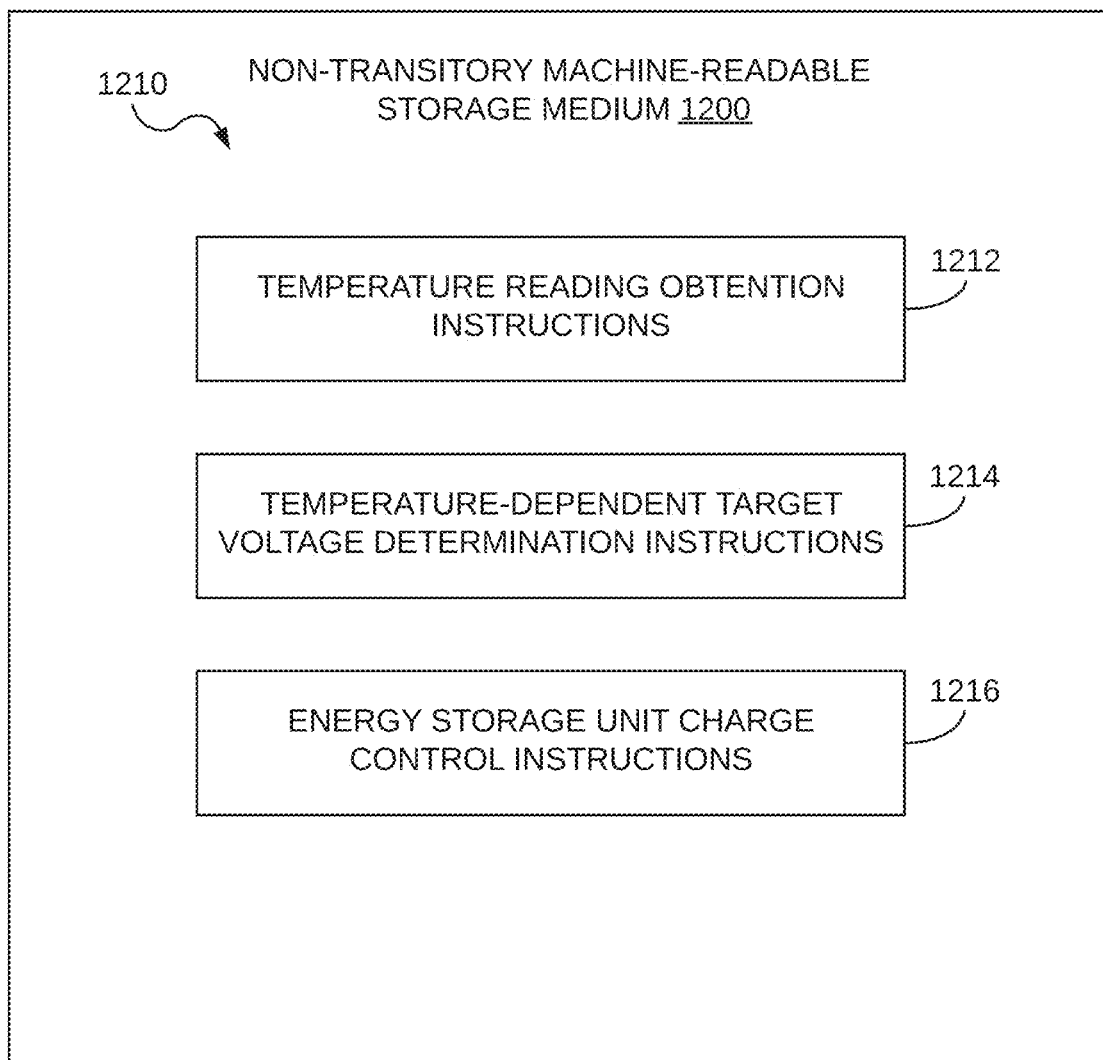
FIG. 12 is a block diagram of an example non-transitory machine-readable storage medium that stores instructions that, when executed, cause a controller of an asset tracking device to execute a method for temperature-dependent charging of an energy storage unit of an asset tracking device.

FIG. 12 is a block diagram of a non-transitory machine-readable storage medium 1200 which stores temperature-dependent charge control programming instructions 1210, in accordance with example embodiments. The non-transitory machine-readable storage medium 1200 may be understood to be any medium which can store the temperature-dependent charge control programming instructions 1210 to be executable by a processor of a computing device, such as, for example, the controller 1120 of FIG. 11. The temperature-dependent charge control programming instructions 1210 may be similar to the temperature-dependent charge control instructions 1122 of FIG. 11, and thus for convenience, the temperature-dependent charge control programming instructions 1210 are described with reference to the asset tracking device 1100 of FIG. 11. However, it is to be understood that the temperature-dependent charge control programming instructions 1210 may be executed by another system or device.

Thus, the temperature-dependent charge control programming instructions 1210 include temperature reading obtention instructions 1212 to obtain a temperature reading measured at the asset tracking device 1100.

The temperature-dependent charge control programming instructions 1210 further include temperature-dependent target voltage determination instructions 1214 to determine a target voltage for the supercapacitor energy storage unit 1114 of the asset tracking device 1100 based on the temperature reading to balance utilization of a capacity of the supercapacitor energy storage unit 1114 against temperature-dependent deterioration of the supercapacitor energy storage unit 1114.

The temperature-dependent charge control programming instructions 1210 further include energy storage unit charge control instructions 1216 to control the charging interface 1116 of the asset tracking device 1100 to charge the supercapacitor energy storage unit 1114 to the target voltage.

As described above, the temperature-dependent charge control programming instructions 1210 may be similar to the temperature-dependent charge control instructions 1122 executable by the controller 1120 of FIG. 11 to monitor travel of the asset 1102.

Figure 13:
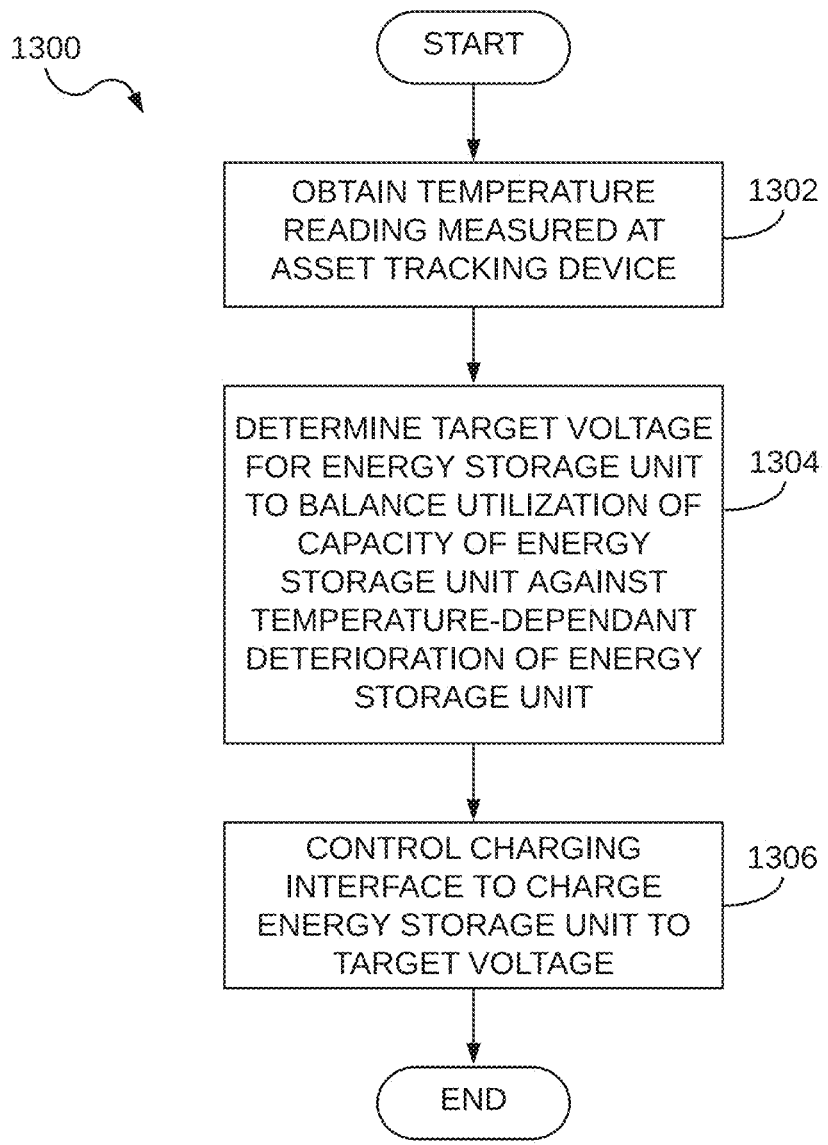
FIG. 13 is a flowchart of an example method for temperature-dependent charging of an energy storage unit of an asset tracking device.

FIG. 13 is a flowchart of a method 1300 for temperature-dependent charging of a supercapacitor energy storage unit, in accordance with an example embodiment. The method 1300 may be similar to a method performed by the controller 1120 upon execution of the temperature-dependent charge control instructions 1122. Thus, for convenience, the method 1300 is described with reference to the asset tracking device 1100. However, it is to be understood that the method 1300 may be performed by other systems or devices.

At block 1302, the controller 1120 obtains a temperature reading measured at the asset tracking device 1100. The temperature reading may be obtained from the temperature sensor 1112, or may be obtained from memory. In some examples, the controller 1120 may obtain one or more additional previously measured temperature readings measured at the asset tracking device 1100.

At block 1304, the controller 1120 determines a target voltage for the supercapacitor energy storage unit 1114 of the asset tracking device 1100 based on the temperature reading. The target voltage is to balance utilization of a capacity of the supercapacitor energy storage unit 1114 against temperature-dependent deterioration of the supercapacitor energy storage unit 1114. The determination may be made based on a supercapacitor degradation model of the supercapacitor energy storage unit 1114, for example, as described in FIG. 14, below.

In some examples, where the controller 1120 obtains additional previously measured temperature readings, the controller 1120 may determine the target voltage further based on the one or more additional previously measured temperature readings.

At block 1306, the controller 1120 controls the charging interface 1116 of the asset tracking device 1100 to charge the supercapacitor energy storage unit 1114 to the target voltage.

As described above, the method 1300 may be similar to a method performed by the controller 1120 of FIG. 11 upon execution of the temperature-dependent charge control instructions 1122 to charge the supercapacitor energy storage unit 1114.

Figure 14:
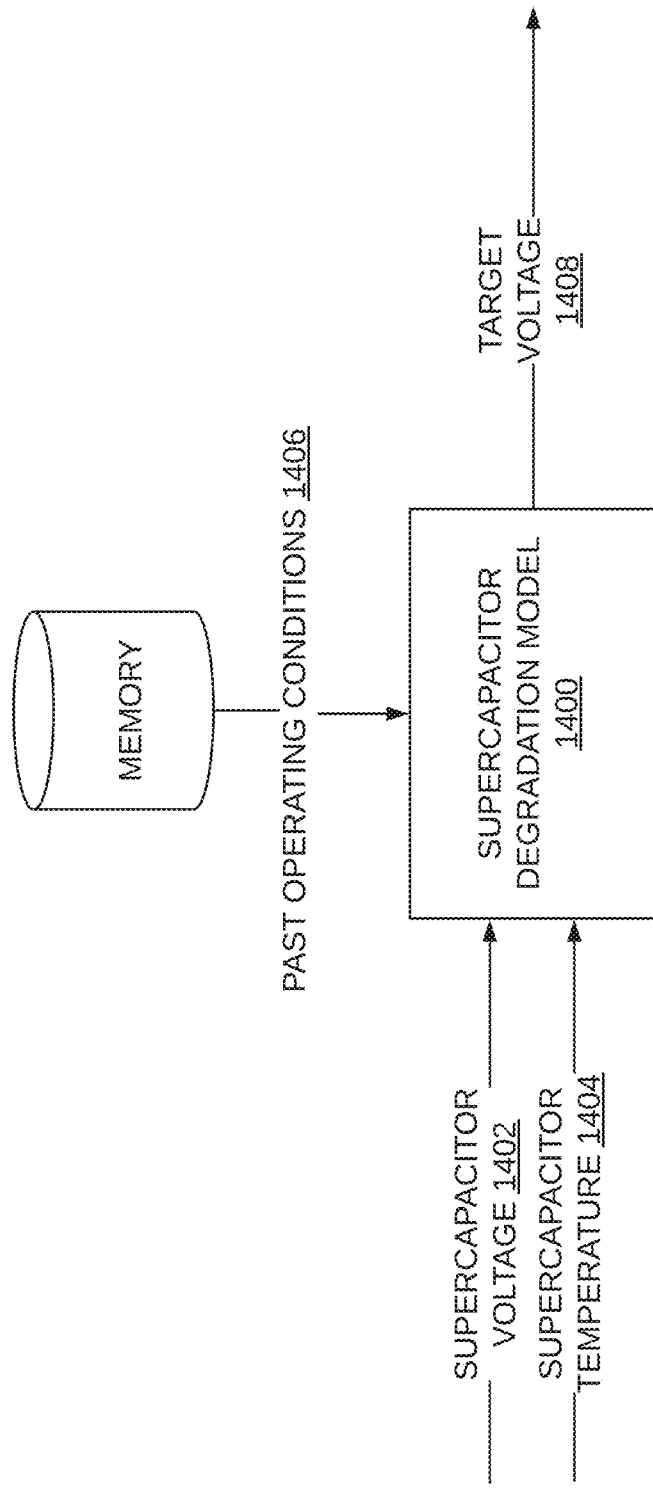
FIG. 14 is a schematic diagram of an example supercapacitor degradation model for determining a target voltage to which a supercapacitor energy storage unit of an asset tracking device is to be charged.

FIG. 14 is a schematic diagram of a supercapacitor degradation model 1400, in accordance with an example embodiment. The supercapacitor degradation model 1400 may be stored in memory of an asset tracking device and referenced when charging a supercapacitor energy storage unit of the asset tracking device. For example, the supercapacitor degradation model 1400 may be stored in memory accessible by the controller 1120 of the asset tracking device 1100 of FIG. 11 to determine the voltage to which the supercapacitor energy storage unit 1114 is to be charged. For convenience, the supercapacitor degradation model 1400 will be described with reference to the asset tracking device 1100 of FIG. 11, but this is not limiting, and the supercapacitor degradation model 1400 may be used by other systems or devices.

The supercapacitor degradation model 1400 takes as input the supercapacitor temperature of the supercapacitor(s) of the supercapacitor energy storage unit 1114. The supercapacitor degradation model 1400 may also take as input the supercapacitor voltage 1402 of the supercapacitor(s) of the supercapacitor energy storage unit 1114. The supercapacitor degradation model 1400 may also take as input past operating conditions 1406, which may include past voltage readings and/or past temperature readings of the supercapacitor(s) of the supercapacitor energy storage unit 1114. The past operating conditions 1406 may be stored in memory at the asset tracking device. The supercapacitor degradation model 1400 may also take as inputs additional factors, such as the number and types of supercapacitor(s) in the supercapacitor energy storage unit 1114, and any properties thereof, such as the energy capacities, maximum voltages, and number of previous charge cycles, of such supercapacitor(s).

The supercapacitor degradation model 1400 computes a target voltage 1408 to which the supercapacitor energy storage unit 1114 is to be charged, based on the inputs, in order to balance utilization of a capacity of the supercapacitor storage unit against temperature-dependent deterioration of the supercapacitor storage unit.

The computation of the target voltage 1408 may involve any combination of a number of techniques, some examples of which are discussed here. The computation of the target voltage 1408 may involve referencing a table that lists temperature ranges and voltages to be targeted when the supercapacitors are within the listed temperature ranges. The computation of the target voltage 1408 may involve reading the target voltage 1408 from a temperature-voltage curve, such as in the plot shown in FIG. 15, below. The computation of the target voltage 1408 may involve the evaluation of a function that takes as arguments any combination of the supercapacitor voltage 1402, the supercapacitor temperature 1404, and past operating conditions 1406, or any other factor described above, to mathematically compute the target voltage 1408. The computation of the target voltage 1408 may involve application of a machine learning model that is trained to output the target voltage 1408, the machine learning model having been trained to determine the target voltage 1408 that achieves a target balance between utilization of the capacity of the supercapacitor energy storage unit 1114 and longevity of the supercapacitor energy storage unit 1114 throughout a range of temperature conditions.

Determination of the target voltage 1408 may also involve referencing a charge cycle deterioration model of the supercapacitor energy storage unit 1114 that provides a model for how the supercapacitor(s) of the supercapacitor energy storage unit 1114 deteriorate after repeated charge cycles. Such a charge cycle deterioration model may be expanded or enhanced by the inclusion of temperature information. Thus, the use and lifecycle of asset tracking devices may be extended by the use of supercapacitor energy storage units that are charged according to temperature-dependent charging techniques.

Figure 15:
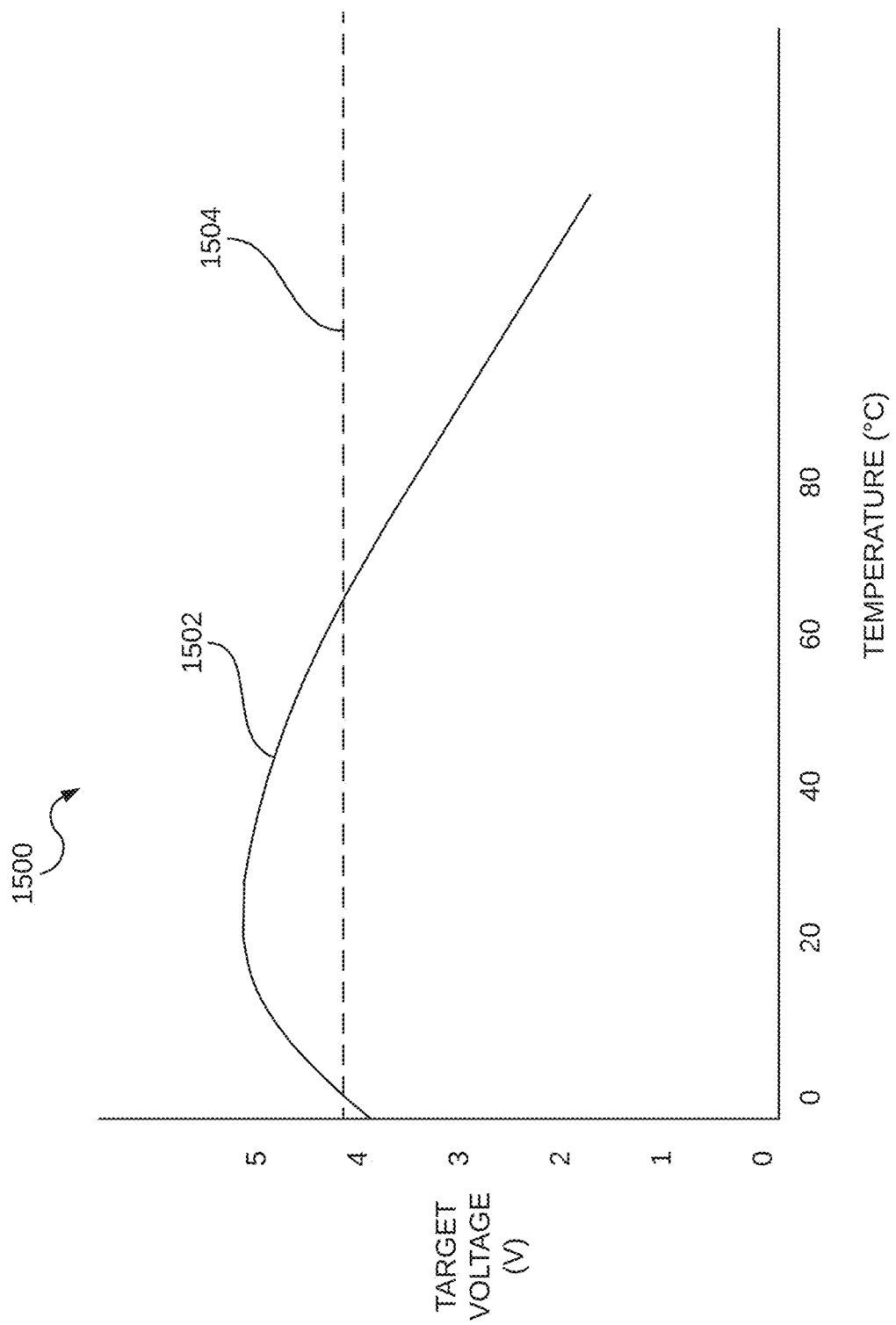
FIG. 15 is a plot showing an example relationship between temperature and a target voltage to which an energy storage unit of an asset tracking device is to be charged.

FIG. 15 shows an example for a temperature-voltage plot 1500. The temperature-voltage plot 1500 includes a temperature-voltage curve 1502 which represents a function that relates temperatures of supercapacitors to target voltages of supercapacitors, in accordance with an example of the present disclosure. The temperature-voltage curve 1502 may be referenced to determine a target voltage to which a supercapacitor is to be charged when the supercapacitor is at a given temperature in order to achieve a high degree of utilization of the capacity of the supercapacitor without significant degradation of the supercapacitor. The temperature-voltage plot 1500 also includes a heuristic line 1504 which defines a heuristic amount to which a supercapacitor may be charged at any temperature (i.e., when temperature is unknown).

There are points along the temperature-voltage curve 1502 which are lower than the heuristic line 1504, and there are points along the temperature-voltage curve 1502 which are higher than the heuristic line 1504. Where the temperature-voltage curve 1502 is lower than the heuristic line 1504, reference to the temperature-voltage curve 1502 indicates that a supercapacitor is to be charged to a lower voltage than the heuristic amount in order to conserve longevity of the supercapacitor. Where the temperature-voltage curve 1502 is higher than the heuristic line 1504, reference to the temperature-voltage curve 1502 indicates that a supercapacitor is to be charged to a higher voltage than the heuristic amount in order to take advantage of a greater proportion of the capacity of the supercapacitor. Thus, reference to the temperature-voltage curve 1502 may be had to charge a supercapacitor in a manner that balances utilization of the capacity of a supercapacitor without unduly deteriorating the supercapacitor.

In the temperature-voltage plot 1500 shown in FIG. 15, the target voltage increases with temperature from about 0° C. until about 20° C., at which point one or more supercapacitors are to be charged to its/their highest recommended amount (e.g., about 5V), and decreases at higher temperatures. Thus, a supercapacitor is to be charged to a lower voltage in lower temperatures (e.g., temperatures below about 20° C.), to a higher voltage in moderate temperatures (e.g., temperatures near 20° C.), and to a lower voltage in higher temperatures (e.g., temperatures higher than about 20° C.). It is to be emphasized that the temperature-voltage plot 1500 shown is for illustrative purposes only, and other relationships between supercapacitor temperature and target voltage may be used.

Figure 16:
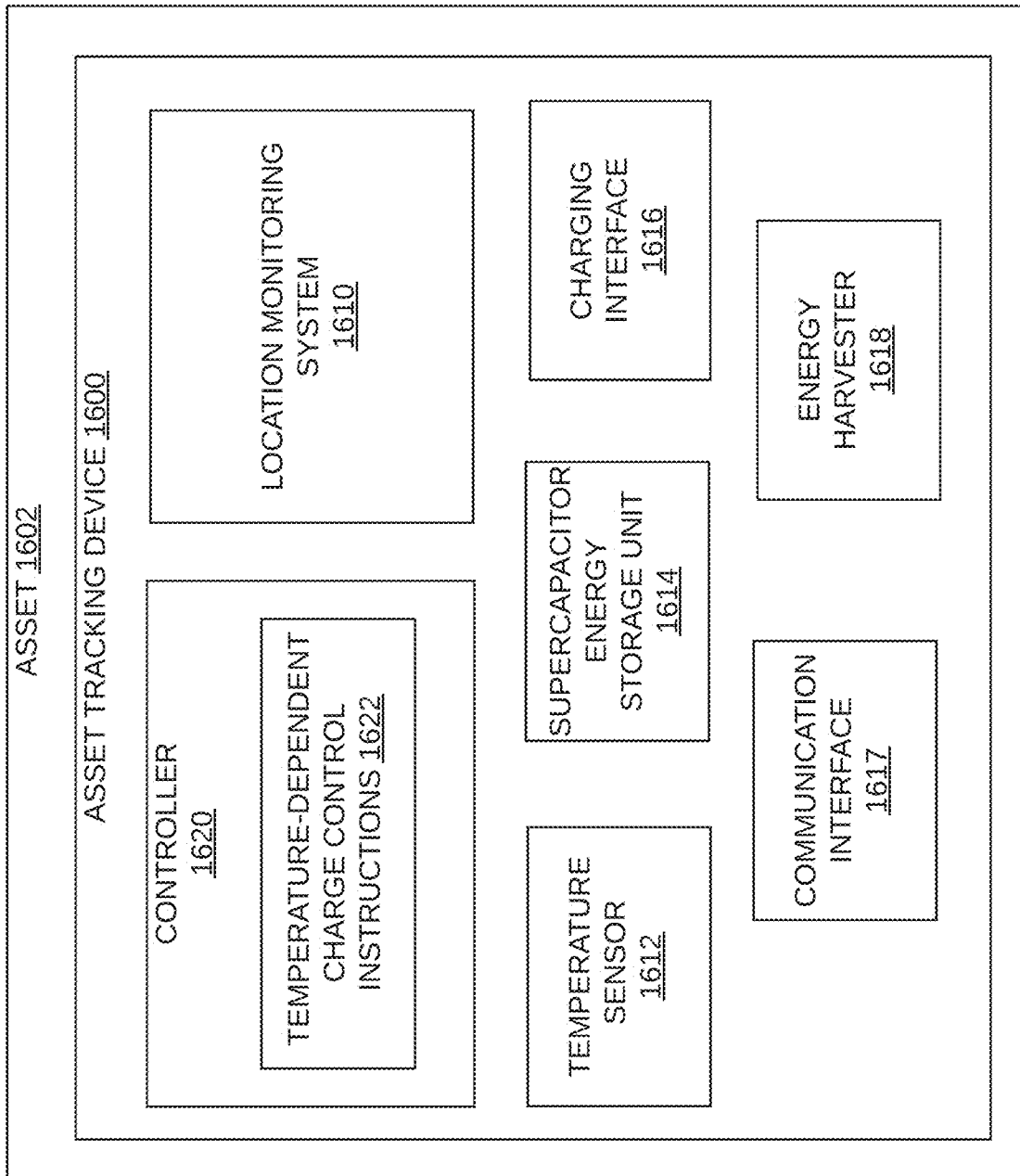
FIG. 16 is a block diagram of another example asset tracking device with temperature-dependent charging, the asset tracking device including an energy harvester and communication interface.

FIG. 16 is a block diagram showing another example of an asset tracking device 1600 with temperature-dependent charging. The asset tracking device 1600 is similar to the asset tracking device 1100 of FIG. 1, with like components numbered in the "1600" series rather than the "1100" series, and therefore includes a location monitoring system 1610, a controller 1620 to execute temperature-dependent charge control instructions 1622, a temperature sensor 1612, a supercapacitor energy storage unit 1614, and a charging interface 1616, and is located at an asset 1602 to monitor travel of the asset 1602.

The asset tracking device 1600 further includes a communication interface 1617. The communication interface 1617 is to receive environmental data from a remote server that may pertain to an environmental condition at the asset tracking device 1600 that may be relevant to the charging of the supercapacitor energy storage unit 1614. For example, the environmental data may include temperature data that indicates a regional temperature (i.e., a forecasted temperature) at the location of the asset tracking device 1600. The controller 1620 may incorporate this temperature data into its determination of the target voltage to which the supercapacitor energy storage unit 1614 is to be charged. For example, the controller 1620 may use a weighted average of one or more temperature readings taken by the temperature sensor 1612 and the temperature data. The temperature data may include forecasts for temperature in the area of the asset tracking device 1600 over the upcoming hours, or days, in the region, which may be relevant to the determination of the target voltage of the supercapacitor energy storage unit 1614. The environmental data may be obtained from an asset tracking device management system or from other systems.

The asset tracking device 1600 further includes an energy harvester 1618 to supply energy to the supercapacitor energy storage unit 1614. The energy harvester 1618 supplies energy to the supercapacitor energy storage unit 1614 through the charging interface 1616. The energy harvester 1618 may include a solar panel to harvest solar energy. Where the energy harvester 1618 includes a solar panel, the environmental data obtained by the communication interface 1617 may be particularly relevant to the energy that could be expected to be harvested from the energy harvester 1618. For example, the environmental data may include sunlight data that indicates an amount of sunlight expected to reach the asset tracking device 1600 at the present location. The controller 1620 may incorporate this sunlight data into its determination of the target voltage to which the supercapacitor energy storage unit 1614 is to be charged. For example, if the sunlight data indicates that the asset tracking device 1600 is expected to receive a great amount of sunlight in the upcoming days, and temperature data indicates that the asset tracking device 1600 is expected to be at adversely high temperatures in the upcoming days that would risk deteriorating supercapacitors if charged to a high voltage, the controller 1620 may determine that the supercapacitors can be maintained at low voltage (to protect longevity in high temperatures) with little risk of the energy of the supercapacitors being depleted (due to the ongoing charging to be provided by the solar panel over the upcoming days). Thus, the temperature-dependent charge control instructions 1622 may include such logic that determines the target voltage for the supercapacitor energy storage unit 1614 based, at least in part, on the environmental data obtained by the communication interface 1617.

Thus, as described above, it can be seen that an asset tracking device may include an onboard supercapacitor energy storage unit that may be intelligently charged based on temperature-dependent charge control instructions. The supercapacitor energy storage unit may be charged to a target voltage that utilizes a high proportion of the capacity of the supercapacitors thereof without undue degradation of the supercapacitors caused by factors relating to temperature. The supercapacitor energy storage unit may be charged according to rules that consider temperature, sunlight, and other environmental conditions as factors, thereby enabling the asset tracking device to maintain a usable store of energy when deployed in the field for an extended period of time. Asset tracking devices that are able to operate in the field for an extended period of time may be particularly useful when used as part of a large group of asset tracking devices, some of which may track non-vehicular assets that may be deployed in the field for particularly extended periods of time.

As described below, large groups of assets may contain smaller groups of assets that travel together in observable ways. For example, a transport truck with an asset tracking device connected to the truck may pull a transport trailer which is tracked by a separate asset tracking device. By observing the travel histories of these two asset tracking devices, the two asset tracking devices can be linked, paired, grouped, or associated together in an asset tracking device management system, thereby allowing the movement of each of these assets to be more effectively tracked. Information related to assets that travel together may be presented to a viewer in a more concise and organized fashion if the asset tracking devices are linked together and the information is presented in a combined way. Further, greater insights may be obtained from the data collected from each of the asset tracking devices that travel in a group if such information is combined or compiled than if the information were analyzed separately.

Figure 17:
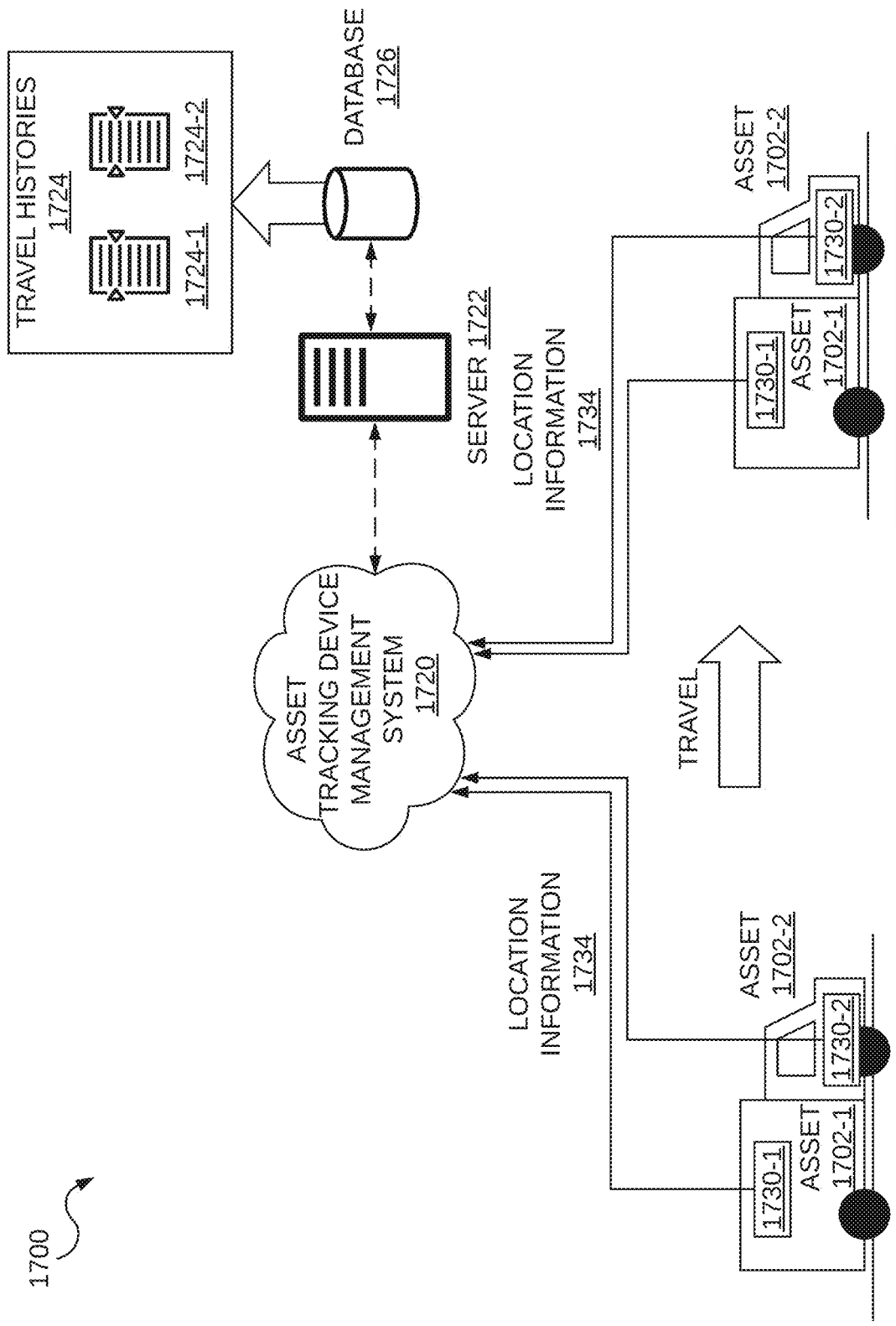
FIG. 17 is a schematic diagram of an example system for monitoring the travel of assets that travel together.

FIG. 17 is a schematic diagram of a system 1700 for asset travel monitoring that involves the monitoring of asset tracking devices that travel together, in accordance with an example embodiment. The system 1700 may be similar to the system 100 of FIG. 1, with components numbered in the "1700" series rather than the "100" series, and therefore includes an asset tracking device management system 1720 with a server 1722, a first asset tracking device 1730-1 to monitor travel of a first asset 1702-1, and further includes a second asset tracking device 1730-2 to monitor travel of a second asset 1702-2. The first asset tracking device 1730-1 and the second asset tracking device 1730-2, transmit location information 1734, which includes location information about each of the first asset tracking device 1730-1 and the second asset tracking device 1730-2 (which each may be similar to the location 134 from FIG. 1) to the asset tracking device management system 1720.

The asset tracking device management system 1720 compiles the location information 1734 into travel histories 1724 (containing first travel history 1724-1 and the second travel history 1724-2 of the first asset tracking device 1730-1 and the second asset tracking device 1730-2, respectively) in an asset tracking database 1726. The travel histories 1724 contain historical records of the travels of one or more asset tracking devices, including each of the first asset tracking device 1730-1 and the second asset tracking device 1730-2, including trip start locations, trip end locations, and trip durations. The travel histories 1724 may also include more detailed travel information, such as motion sensor data, temperature data, speed data, collected during the trips travelled by the asset tracking devices 1730, and any other information collected from asset tracking devices.

In the example shown, the first asset tracking device 1730-1 is located at a first asset 1702-1, shown for example to be a transport trailer. Further, the second asset tracking device 1730-2 is located at a second asset 1702-2, shown for example to be a transport truck connected to the transport trailer. Thus, the first asset 1702-1 and second asset 1702-2 travel together, as the second asset 1702-2 moves the first asset 1702-1.

The asset tracking device management system 1720 is configured to identify asset tracking devices, such as the first asset tracking device 1730-1 and the second asset tracking device 1730-2, that travel together. Once identified, the asset tracking device management system 1720 links (or "tethers") together the asset tracking devices that travel together (e.g., the first asset tracking device 1730-1 and the second asset tracking device 1730-2) in the asset tracking database 1726. In other words, a flag or association between the linked asset tracking devices is stored. Once linked (or "tethered"), information related to the travel of the two assets may be more effectively presented to a viewer in a more concise and organized fashion, and greater insights may be obtained by compiling data collected by the two asset tracking devices. An example of a method by which the asset tracking device management system 1720 may identify is provided in FIG. 18, below.

In the present example, the first asset 1702-1 and the second asset 1702-2 are shown to be a transport trailer and a transport truck pulling the transport trailer, respectively. In general, the first asset tracking device 1730-1 may be located at a non-vehicular asset (i.e., the transport trailer, which is the first asset 1702-1), the second asset tracking device 1730-2 may be located at a vehicle (i.e., the transport truck, which is the second asset 1702-2), where the vehicle is to control travel of the non-vehicular asset (i.e., the transport truck pulls the transport trailer). Further, the non-vehicular asset may be coupleable to the vehicle (e.g., the transport trailer is coupleable to the transport truck), or may be storable on, or otherwise transportable by, the vehicle (e.g., a shipping pallet may be stored in and transported by a transport truck).

However, it is to be understood that either of the first asset 1702-1 and the second asset 1702-2 may be a vehicular or a non-vehicular asset. For example, the first asset 1702-1 and the second asset 1702-2 may be vehicles that have been identified to travel together, such as, for example, in the case where the first vehicle is a tow truck that is identified to have towed the second vehicle, or where the first vehicle is a delivery truck that delivers vehicles. As another example, both the first asset 1702-1 and the second asset 1702-2 may be non-vehicular assets that have been identified to travel together, such as, in the case where both assets are shipping containers travelling on the same ship, or in the case where both assets are train cars pulled by the same locomotive, or in the case where both assets are shipping pallets being transported by the same truck, or in any combination of these and similar cases. In each case, it may be advantageous to link together each of the non-vehicular assets for logistical purposes (e.g., to track the movement of shipments or other logistical assets) or for gathering insights from the data collected from the asset tracking devices tracking each of the assets.

Figure 18:
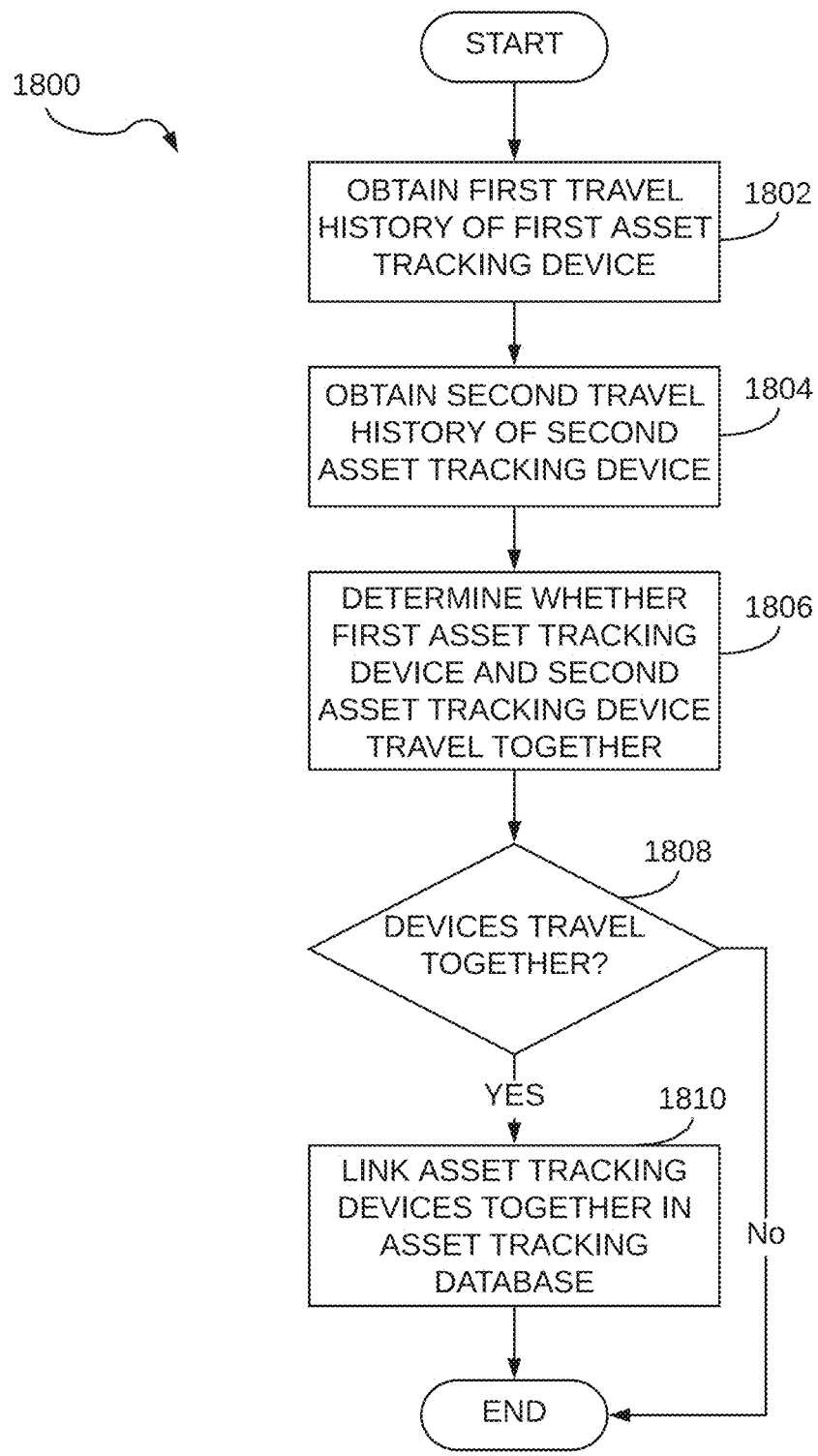
FIG. 18 is a flowchart of another example method for monitoring the travel of assets that travel together.

FIG. 18 is a flowchart of a method 1800 for monitoring the travel of assets that travel together, in accordance with embodiments of the present disclosure. The method 1800 may be understood to be one example of a method performed by the server 1722 of the asset tracking device management system 1720 of the system 1700 of FIG. 17 to monitor the travel of assets that travel together. Thus, for convenience, the method 1800 is described with reference to the system 1700 of FIG. 17. However, it is to be understood that the method 1800 may be performed by other systems or devices.

At block 1802, the server 1722 obtains a first travel history 1724-1 of the first asset tracking device 1730-1. For example, the server 1722 obtains the first travel history 1724-1 from the asset tracking database 1726.

At block 1804, the server 1722 obtains a second travel history 1724-2 of the second asset tracking device 1730-2. For example, the server 1722 obtains the second travel history 1724-2 from the asset tracking database 1726.

At block 1806, the server 1722 determines, based on the first travel history 1724-1 and the second travel history 1724-2, whether the first asset tracking device 1730-1 and the second asset tracking device 1730-2 travel together.

The determination of whether the first asset tracking device 1730-1 and the second asset tracking device 1730-2 travel together may be made in any of a number of ways. For example, it may be determined that the first asset tracking device 1730-1 and the second asset tracking device 1730-2 travel together by determining that a first trip travelled by the first asset tracking device 1730-1 recorded in the first travel history 1724-1 matches a second trip recorded in the second travel history 1724-2 travelled by the second asset tracking device 1730-2. Identifying such a match may involve determining that the first asset tracking device 1730-1 and the second asset tracking device 1730-2 were in a vicinity of one another throughout a duration of the first trip and the second trip. This may be determined with reference to location information (e.g., latitude/longitude information) recorded in the travel histories 1724 (see, for example, FIG. 19). Such a match may also be identified by determining that the first trip and the second trip start and finish at the same time and at the same place, or, in other words, are coterminous and contemporaneous with one another. Again, this may be determined with reference to location information (e.g., latitude/longitude information) recorded in the travel histories 1724 (see, for example, FIG. 19).

At block 1808, where it is determined that the first asset tracking device 1730-1 and the second asset tracking device 1730-2 travel together, block 1810 is executed, else the method 1800 is ended.

At block 1810, upon determination that the first asset tracking device 1730-1 and the second asset tracking device 1730-2 travel together, the server 1722 links the first asset tracking device 1730-1 and the second asset tracking device 1730-2 together in the asset tracking database 1726 to indicate that the first asset tracking device 1730-1 and the second asset tracking device 1730-2 travel together. For example, a flag or association between the linked asset tracking devices (i.e., the first asset tracking device 1730-1 and the second asset tracking device 1730-2) is stored in the asset tracking database 1726.

The method 1800 may be repeated periodically to update linkages between asset tracking devices 1730, including to link together additional asset tracking devices 1730 into larger groups when additional asset tracking devices 1730 are determined to travel together, or to remove linkages between asset tracking devices 1730 which are determined to no longer be travelling together.

In the case where a linkage between asset tracking devices 1730 is removed, the method 1800 may involve the server 1722 obtaining a third travel history of the first asset tracking device 1730-1 (e.g., an update to the first travel history 1724-1), obtaining a fourth travel history of the second asset tracking device 1730-2 (e.g., an update to the second travel history 1724-2), and determining, based on the third and fourth travel histories, that the first asset tracking device 1730-1 and the second asset tracking device 1730-2 have stopped travelling together. For example, the third and fourth travel histories may include more recent trips during which the first asset tracking device 1730-1 and the second asset tracking device 1730-2, were not in the vicinity of one another, or did not end at the same location at the same time.

Upon determination that the first asset tracking device 1730-1 and the second asset tracking device 1730-2 have stopped travelling together, the method 1800 may further involve the server 1722 unlinking the first asset tracking device 1730-1 from the second asset tracking device 1730-2 in the asset tracking database 1726 to indicate that the first asset tracking device 1730-1 and the second asset tracking device 1730-2 have stopped travelling together.

Figure 19:
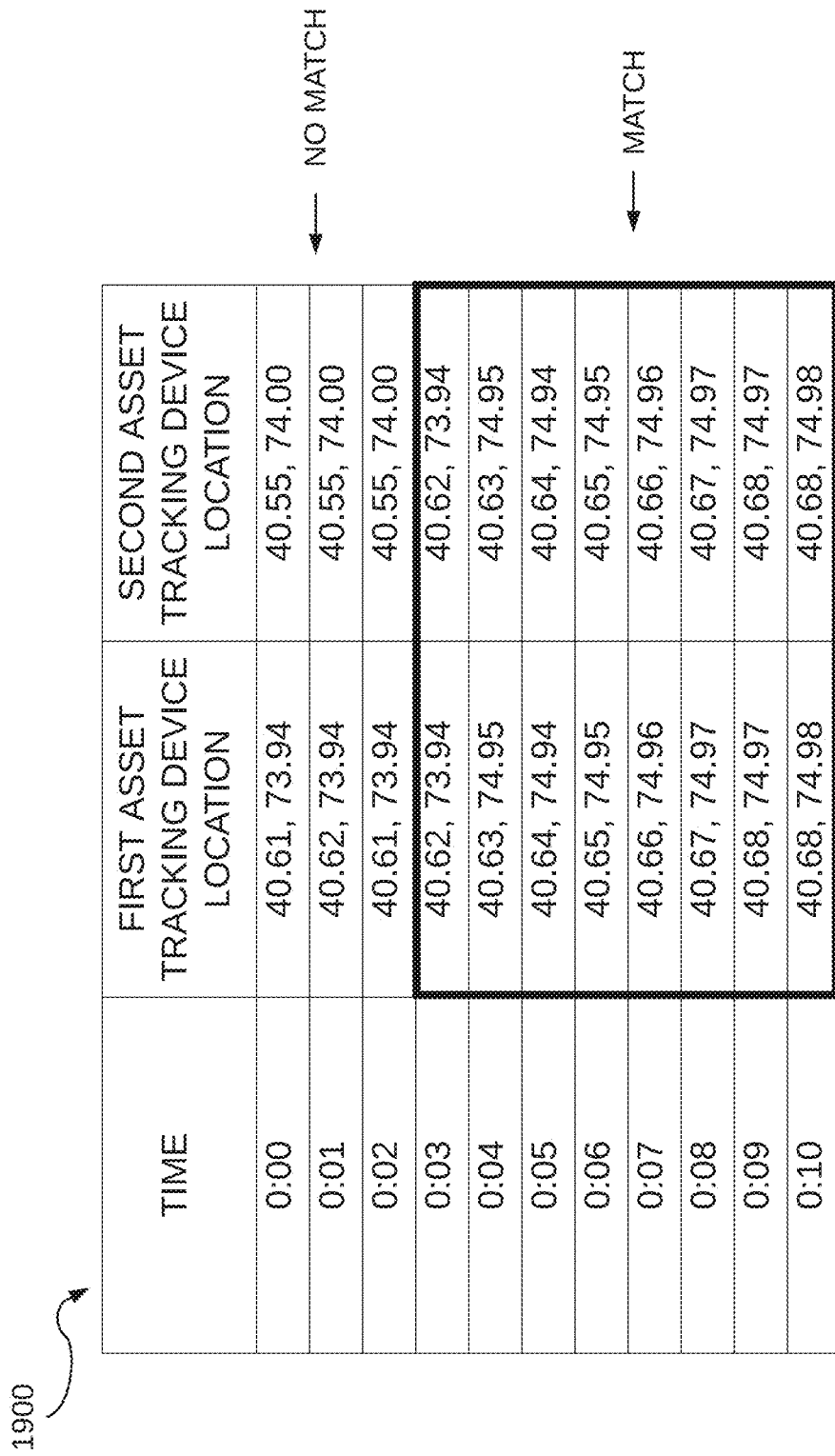
FIG. 19 is a schematic diagram showing a data structure of example trip histories of two asset tracking devices that travel together.

FIG. 19 is a schematic diagram showing a data structure 1900 of example trip histories of two asset tracking devices that travel together. The data structure 1900 includes latitude and longitude information for a first asset tracking device and a second asset tracking device, which may be similar to the first asset tracking device 1730-1 and the second asset tracking device 1730-2, both of FIG. 17. Thus, the data structure 1900 includes location information that describes the travel of two asset tracking devices. The data structure 1900 may include trip histories similar to the travel histories 1724 of FIG. 17. The location information and timestamps presented are for exemplary purposes only.

As shown, during timestamps 0:00-0:02, the first and second asset tracking devices are not in the vicinity of one another. However, during timestamps 0:03-0:010, the first and second asset tracking devices are in substantially the same location at substantially the same time, and start and stop a trip together from timestamp 0:03 to 0:10. In other words, from 0:03 to 0:10, the trip history of the first and second asset tracking devices match, and therefore, the first and second asset tracking devices may be determined to be travelling together during this period.

As further trip information is collected, the data structure 1900 may expand with additional location information that indicates that the first and second asset tracking devices are not in the vicinity of one another and/or do not start and end trips at the same time and place, and therefore may be determined to no longer be travelling together.

It is to be understood that in order to be determined to travel together, the first and second asset tracking devices need not have recorded precisely the same location information, and that the first and second asset tracking devices may be determined to be travelling together if the location information of the two asset tracking devices is only sufficiently similar within an acceptable margin of error.

Figure 20:
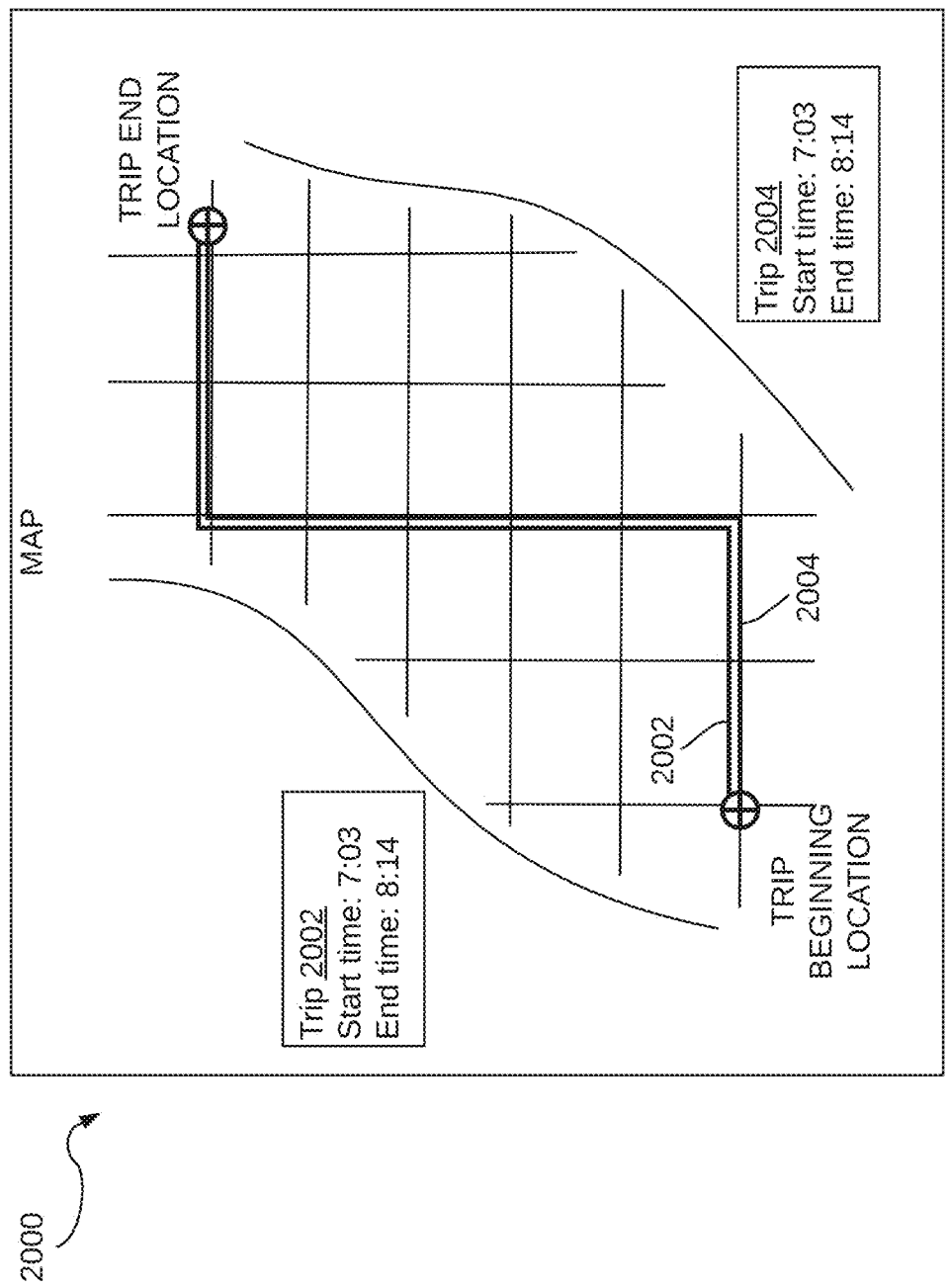
FIG. 20 is a schematic diagram showing a map of example trip histories of two asset tracking devices that travel together.

FIG. 20 is a schematic diagram showing a map 2000 of example trip histories of two asset tracking devices that travel together. The map 2000 may be understood to be a visual representation of a trip similar to the trip travelled by the first and second asset tracking devices of FIG. 19. Thus, it can be seen that the first and second asset tracking devices follow trips 2002, 2004 respectively, that start and stop a trip in the same place at the same time, and are in the vicinity of one another throughout the duration of the trip.

Figure 21:
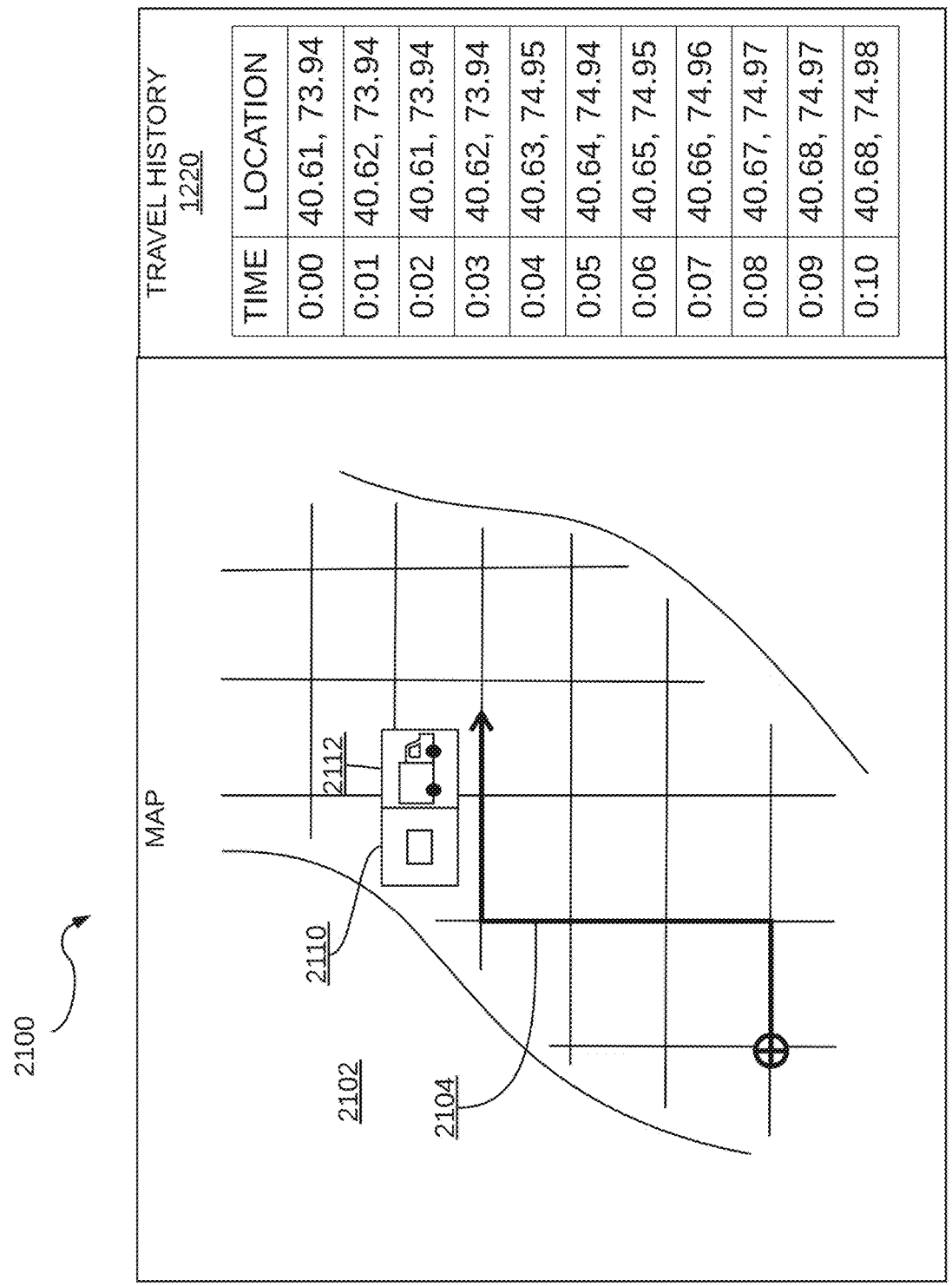
FIG. 21 is a schematic diagram showing an example user interface depicting a trip history of two asset tracking devices that travel together.

FIG. 21 is a schematic diagram showing a user interface 2100 that depicts a trip history of two asset tracking devices that travel together, in accordance with embodiments of the present disclosure. The user interface 2100 provides trip information about a first asset tracking device and a second asset tracking device that track assets that have been determined to travel together, such as, for example, by the techniques described above. The first and second asset tracking devices that travel together may be similar to the first asset tracking device 1730-1 and the second asset tracking device 1730-2, both of FIG. 17, and thus, for convenience, description of the user interface 2100 will be made with reference to the system 1700, and the first asset tracking device 1730-1 and the second asset tracking device 1730-2 of FIG. 17.

The user interface 2100 may be displayed at a display device, such as a display device of a computing device with access to the asset tracking device management system 1720 of FIG. 17.

The user interface 2100 includes a map 2102 onto which a trip path 2104 which visually represents a trip travelled by first asset tracking device 1730-1 and the second asset tracking device 1730-2 is overlain. Since the first asset tracking device 1730-1 and the second asset tracking device 1730-2 travel together, and thus the travel of the first asset tracking device 1730-1 and the second asset tracking device 1730-2 overlap, the trip path 2104 is shown as a single trip. The trip path 2104 may be generated by trip information included in the travel histories 1724. Thus, the server 1722 compiles trip information from the first travel history 1724-1 together with trip information from the second travel history 1724-2 for display at a display device.

The user interface 2100 further includes a first visual indication 2110 of the first asset 1702-1 (tracked by the first asset tracking device 1730-1), and a second visual indication 2112 of a second asset 1702-2 (tracked by the second asset tracking device 1730-2). Each of the first visual indication 2110 and the second visual indication 2112 may include a depiction of the respective asset of the first asset 1702-1 and the second asset 1702-2 that is being tracked. In the present example, the first asset 1702-1 may be a transport trailer, and thus, the first visual indication 2110 includes a depiction of a transport trailer. The second asset 1702-2 may be a transport truck that pulls the transport trailer, and thus the second visual indication 2112 includes a depiction of a transport truck.

In the present example, the first visual indication 2110 and the second visual indication 2112 are shown in visual association with one another, such as, for example, by the first visual indication 2110 and the second visual indication 2112 being placed adjacent or near one another in the user interface 2100 to visually indicate that the first asset 1702-1 and the second asset 1702-2 are linked together and travel together. Thus, the user interface 2100 includes a visual indication that the first asset 1702-1 (and the first asset tracking device 1730-1) travels with the second asset 1702-2 (and the second asset tracking device 1730-2). In some examples, the first visual indication 2110 and the second visual indication 2112 may be combined into a single visual indication of a transport truck travelling with a transport trailer.

The user interface 2100 further includes a trip history component 1220 in which trip information for the trip path 2104 from the travel histories 1724 is compiled and presented. The trip history component 1220 may display the travel histories 1724 of one of the first asset tracking device 1730-1 and the second asset tracking device 1730-2, or an average, combination, or compilation of the location information in the travel histories 1724 (i.e., the first travel history 1724-1 and the second travel history 1724-2).

Thus, information related to the travel of the group of assets that travel together more effectively presented to a viewer in a more concise and organized fashion than if the information were presented about each of the assets individually. Travel histories may be compiled, and trip paths may be combined, so that visual space in the user interface 2100 may be conserved, and so that redundant computations and the storage of redundant data may be avoided.

Further, where information from one of the linked asset tracking devices is lost, similar information from one of the other linked asset tracking devices may provide useful data redundancy for the missed information. For example, where one asset tracking device loses power or network connectivity and therefore stops transmitting location data or other useful data (e.g., temperature data, motion sensor data), the lost information may be inferred from the information gathered from a linked asset tracking device. Thus, the location of a disconnected asset tracking device, temperature at a disconnected asset tracking device, or motion taking place at a disconnected asset tracking device may be estimated based on similar information received from a linked asset tracking device.

Further, greater insights may be obtained by compiling data collected by each of the asset tracking devices that travel in the group. The information obtained from one of the asset tracking devices can be checked, compared against, or combined with the information obtained from the second asset tracking device. For example, where each asset tracking device collects information related to environmental conditions, such as temperature or weather data, a more reliable understanding of the environmental conditions at the asset tracking devices may be discerned upon analysis of the data collected by both asset tracking devices. For example, an average of the temperature data collected by two linked asset tracking devices may be used as an estimate for the actual temperature in the vicinity of both asset tracking devices.

Where environmental data is gathered at one asset tracking device that may be relevant to the second asset tracking device (which may not collect the same environmental data either by fault or by lack of capability), that environmental data may be made available to the control of the second asset tracking device. For example, a determination of whether an asset being tracked by one asset tracking device has started or finished travel may be made based on the motion sensor data collected at a linked asset tracking device. As another example, where one asset tracking device collects temperature data that may be relevant to the charging of a supercapacitor energy storage unit of a linked asset tracking device, that temperature information may be used in the determination of the target voltage to which the supercapacitor energy storage unit is to be charged. Such sharing of information may be mediated by an asset tracking device management system or by direct communication between the linked asset tracking devices.

Further, where a vehicle and another linked asset are involved in an accident or collision (e.g., in the case of a transport truck pulling a transport trailer where each are equipped with asset tracking devices), information that may be relevant to accident recreation (e.g., motion sensor data) from each of the asset tracking devices may be compiled and analyzed for improved accident recreation, or information from one of the asset tracking devices may be used for redundancy if information from the other is faulty. In other words, more accurate and more reliable information may be gathered for accident recreation from the asset tracking device on the transport truck as well as the asset tracking device on the transport trailer. Thus, accident recreation techniques may be improved by the combination of data gathered by two linked asset tracking devices.

Figure 22:
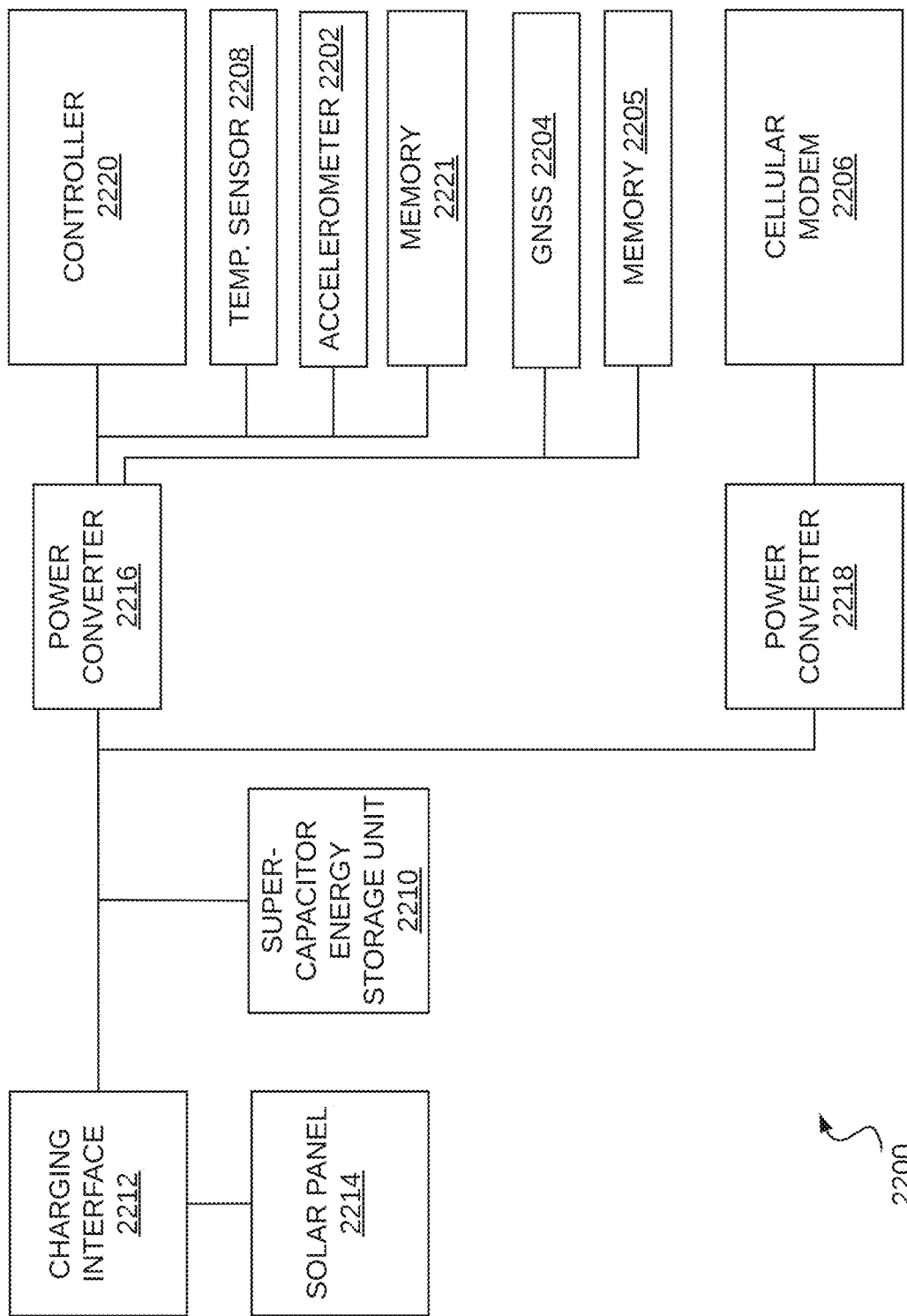
FIG. 22 is a block diagram of another example asset tracking device.

FIG. 22 is a block diagram of another example of an asset tracking device 2200. The asset tracking device 2200 may be understood to be one example implementation of an asset tracking device that may perform any functionality of an asset tracking device described herein, and thus may be similar to the asset tracking device 130 of FIG. 1, the asset tracking device 200 of FIG. 2, the asset tracking device 1100 of FIG. 11, the asset tracking device 1600 of FIG. 16, or the asset tracking devices 1730 of FIG. 17.

The asset tracking device 2200 includes an accelerometer 2202 to detect motion at the asset tracking device 2200, a GNSS module 2204 to locate the asset tracking device 2200, and a cellular modem 2206 to communicate with a remote server. The cellular modem 2206 may include an LTE-M cellular modem. The GNSS module 2204 has access to memory 2205 to store configuration settings, assistance data, and other data for the operation of the GNSS module 2204, and access to the memory 2221 to store location data obtained from a locating system. The memory 2205 and/or 2221 may include a flash memory.

The asset tracking device 2200 further includes a temperature sensor 2208 to capture temperature readings at the asset tracking device 2200, a supercapacitor energy storage unit 2210 to power the asset tracking device 2200, a charging interface 2212 to charge the supercapacitor energy storage unit 2210, and a solar panel 2214 to supply energy to the supercapacitor energy storage unit 2210 through the charging interface 2212. The supercapacitor energy storage unit 2210 may include two 75 F supercapacitors and an active balancing module to balance energy stored at the two supercapacitors.

The asset tracking device 2200 further includes a controller 2220 to perform functionality described herein. The controller 2220 has access to memory 2221 to store programming instructions, temperature data from the temperature sensor 2208, and motion sensor data from the accelerometer 2202. The controller 2220 may be configured to monitor the voltage outputted from the solar panel 2214 and the voltage at the supercapacitor energy storage unit 2210, and may further be configured to modulate the charging of the supercapacitor energy storage unit 2210, and to control low-power operating modes of the controller 2220, GNSS module 2204, and cellular modem 2206, appropriately, to conserve energy. For example, the controller 2220 may operate the cellular modem 2206 and GNSS module 2204 for data transmission only when the transmission of location information is appropriate.

The asset tracking device 2200 further includes a first power converter 2216 to provide adequate voltage from the supercapacitor energy storage unit 2210 to the controller 2220, temperature sensor 2208, accelerometer 2202, memory 2221, GNSS module 2204, and memory 2205. The first power converter 2216 may include a DCDC buck converter. The asset tracking device 2200 further includes a second power converter 2218 to provide adequate voltage from the supercapacitor energy storage unit 2210 to the cellular modem 2206. The second power converter 2218 may include a low-dropout (LDO) regulator.

The controller 2220 may execute programming instructions to perform any of the functionality of an asset tracking device described herein. For example, the controller 2220 may execute programming instructions to perform the method 400 for asset travel monitoring of FIG. 4, the process 900 of FIG. 9 for operating the asset tracking device 2200, the method 1300 of FIG. 13 for temperature-dependent charging of the supercapacitor energy storage unit 2210, and related methods and actions. Thus, the asset tracking device 2200 may determine whether the asset it is tracking has started or finished travel based on motion sensor data from the accelerometer 2202, may charge the supercapacitor energy storage unit 2210 to a target voltage based on temperature data from the temperature sensor 2208 and/or environmental data received via the cellular modem 2206, and may feed location information and other data to an asset tracking device management system which may link the asset tracking device 2200 together with other asset tracking devices that it travels with.

In yet another aspect of the present disclosure, there is provided a method by which status information inferred from data gathered by a second asset tracking device having a second operating mode and coupled to a second asset may be inferred from data gathered by a first asset tracking device having a first operating mode and coupled to a first asset, upon determining that the first asset and the second asset are travelling together. In some embodiments, the first operating mode comprises being powered by an external power source such as a vehicle port, and the second operating mode comprises being powered from an energy harvester such as a battery or a solar panel. For example, a transport truck may be associated with a first asset tracking device drawing power from the transport truck's battery, while the transport trailer connected to the transport truck may contain a second asset tracking device, which may contain an energy harvester, such as a battery or a solar panel.

Figure 23:
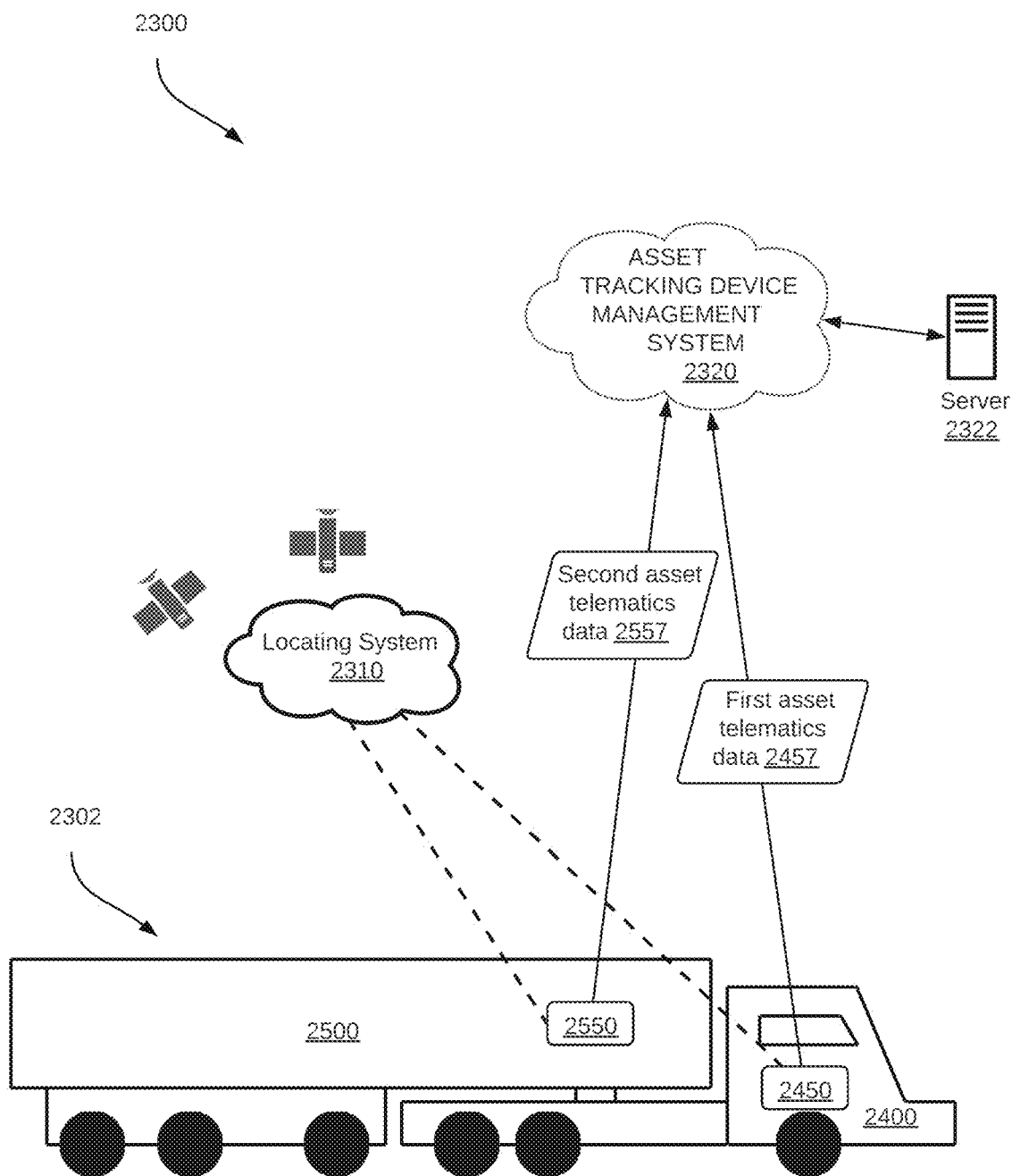
FIG. 23 is a schematic diagram of a system in which a first asset having a first asset tracking device and a second asset having a second asset tracking device are travelling together.

FIG. 23 depicts a system 2300 including a composite asset 2302 in the form of a transport truck and a transport trailer, an asset tracking device management system, 2320, a server 2322, and a locating system 2310.

The composite asset 2302 is comprised of a first asset 2400 in the form of a transport truck and a second asset 2500 in the form of a transport trailer.

The first asset 2400 has a first asset tracking device 2450 coupled thereto. The first asset tracking device 2450 gathers and provides first asset telematics data 2612 to the asset tracking device management system 2320. The first asset telematics data 2612 is comprised of location data pertaining to the first asset 2400, asset data gathered by the first asset tracking device 2450 via an interface port of the first asset 2400, and sensor data provided by sensors of the first asset tracking device 2450. The components of the first asset 2400 and the first asset tracking device 2450 are discussed in detail with reference to FIG. 24.

The second asset 2500 has a second asset tracking device 2550 coupled thereto. The second asset tracking device 2550 gathers and provides second asset telematics data 2712 to the asset tracking device management system 2320. The second asset telematics data 2712 is comprised of location data pertaining to the second asset 2500 and sensor data provided by the sensors of the second asset tracking device 2550. In some instances, the second asset tracking device 2550 may gather asset data from the second asset 2500. The components of the second asset tracking device 2550 and the second are discussed in detail with reference to FIG. 25.

The asset tracking device management system 2320 and the server 2322 are similar to the asset tracking device management system 1720 and the server 1722 discussed above with reference to FIG. 17.

The locating system 2310 is similar to the locating system 110 described above with reference to FIG. 1.

In the system 2300 the first asset tracking device 2450 obtains first location information of the first asset 2400 by utilizing the locating system 2310. Similarly, the second asset tracking device 2550 obtains second location information of the second asset 2500 by utilizing the locating system 2310. The first asset tracking device combines the first location information with first asset information and first asset tracking device sensor information to generate the first asset telematics data 2612. Similarly, the second asset tracking device combines the first location information with second asset information (if applicable) and second asset tracking device sensor information to generate the second asset telematics data 2712. The first asset tracking device 2450 sends the first asset telematics data 2612 the asset tracking device management system 2320. Similarly, the second asset tracking device 2550 sends the second asset telematics data 2712 to the asset tracking device management system 2320.

Figure 24:
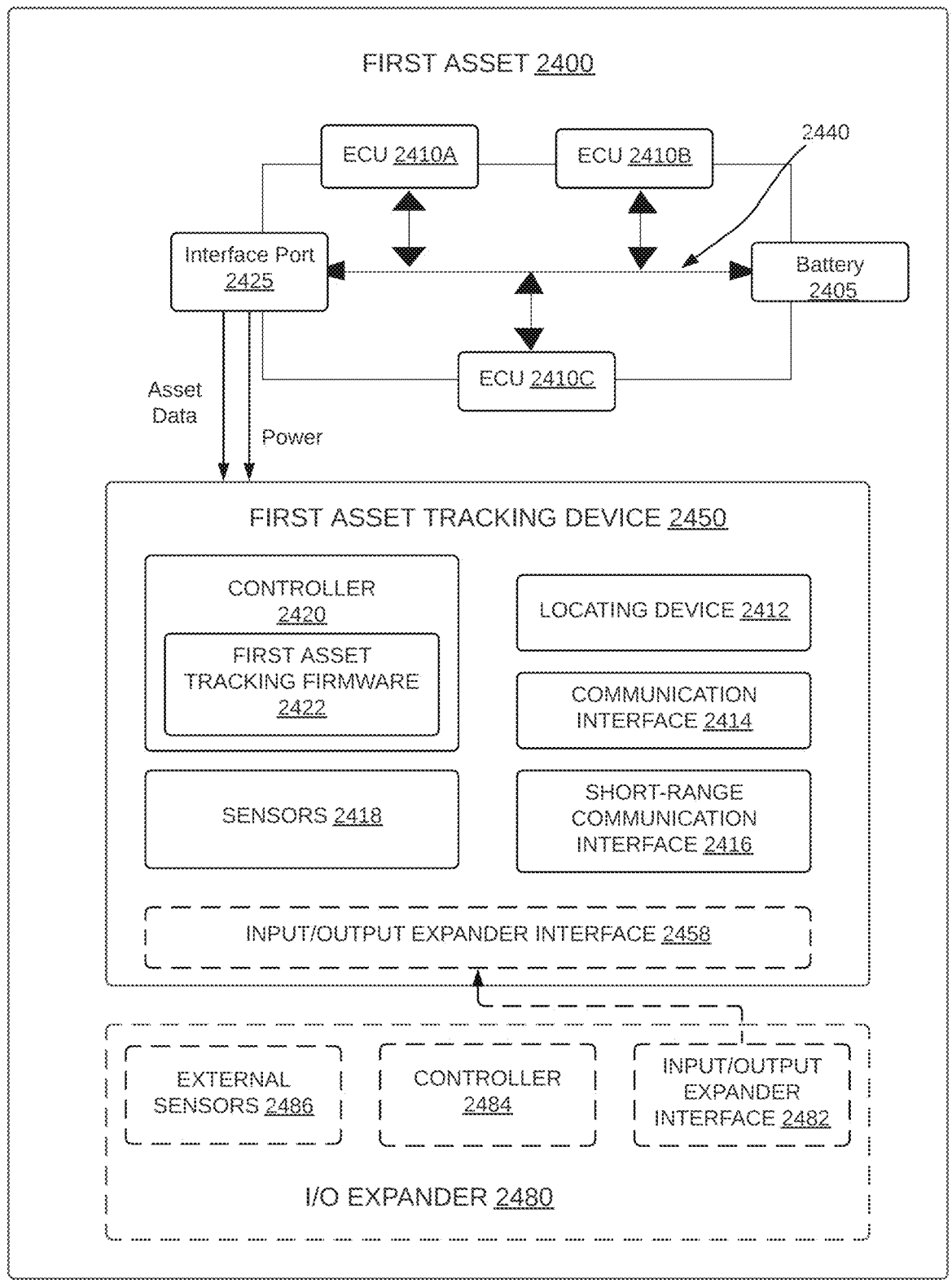
FIG. 24 is a block diagram of a first asset including a first asset tracking device having a first operating mode and an optional input/output expander coupled thereto.

FIG. 24 is a block diagram showing some components of the first asset 2400 including the first asset tracking device 2450, and an optional input/output (I/O) expander 2480.

The first asset 2400 may have a plurality of electronic control units (ECUs). An ECU is an electronic module which interfaces with one or more sensors for gathering information from the first asset 2400. For example, an oil temperature ECU may contain a temperature sensor and a controller for converting the measured temperature into digital data representative of the oil temperature. Similarly, a battery voltage ECU may contain a voltage sensor for measuring the voltage at the positive battery terminal and a controller for converting the measured voltage into digital data representative of the battery voltage. A vehicle may, for example, have around seventy ECUs. For simplicity, only a few of the ECUs 2410 are depicted in FIG. 24. For example, in the depicted embodiment the first asset 2400 has three electronic control units: ECU 2410A, ECU 2410B, and ECU 2410C ("ECUs 2410"). The ECU 2410A, the ECU 2410B, and the ECU 2410C are shown to be interconnected via an asset communications bus, such as a Controller Area Network (CAN) bus 2440. ECUs 2410 interconnected using a CAN bus send and receive information to one another in CAN frames by placing the information on the CAN bus 2440. When an ECU places information on the CAN bus 2440, other ECUs 2410 receive the information and may or may not consume or use that information. Different protocols may be used to exchange information between the ECUs over a CAN bus. For example, ECUs 2410 in trucks and heavy vehicles use the Society of Automotive Engineering (SAE) J1939 protocol to exchange information over a CAN bus 2440. Most passenger vehicles use the SAE J1979 protocol, which is commonly known as On-Board Diagnostic (OBD) protocol to exchange information between ECUs 2410 on their CAN bus 2440. In industrial automation, ECUs use a CANOpen protocol to exchange information over a CAN bus 2440. The first asset 2400 may allow access to information exchanged over the CAN bus 2440 via an interface port 2425. For example, if the first asset 2400 is a passenger car, then the interface port 2425 is most likely an OBD-II port. Data accessible through the interface port 2425 is termed the asset data. The asset data, received at the first asset tracking device 2450, from the first asset 2400 may be in the form of data messages, such as CAN frames. Asset data may describe one or more of any of: a property, a state, and an operating condition of the first asset 2400. For example, where the first asset 2400 is a vehicle, the data may describe the speed at which the vehicle is travelling, a state of the vehicle (off, idle, or running), or an engine operating condition (e.g., engine oil temperature, engine revolutions per minute (RPM), or a battery voltage). In some embodiments, the interface port 2425 includes a power interface for providing electric power to a telematics device connected thereto, such as the first asset tracking device 2450.

The first asset tracking device 2450 comprises a controller 2420, a locating device 2412, a communication interface 2414, a short-range communication interface 2416, one or more sensors 2418, and optionally an input/output expander interface 2458. The first asset tracking device 2450 is connected to the first asset 2400 via the interface port 2425 of the first asset 2400. The first asset tracking device 2450 receives both asset data and electric power from the interface port 2425 of the first asset 2400.

The controller 2420 is similar to the controller 220 of FIG. 2, for example, but contains a first asset tracking firmware 2422, which includes machine-executable programming instructions that configure the first asset tracking device 2450 to carry out some of the methods of the present disclosure.

The locating device 2412 is similar to the locating device 212 described above. The communication interface 2414 is similar to the communication interface 214.

The short-range communication interface 2416 allows the first asset tracking device 2450 to communicate wirelessly with other devices within a short range of distance. As an example, the short-range communication interface 2416 may be a Bluetooth interface, a Wireless Fidelity (Wi-Fi) interface, or any other short-range wireless communications interface operating in the Industrial, Scientific and Medical (ISM) unlicensed band.

The sensors 2418 may comprise one or more sensors disposed in the first asset tracking device 2450. For example, the sensors 2418 may be one or more of motion sensors, temperature sensors, optical sensors, gas sensors, or any other sensor gathering data for the first asset tracking device 2450. In some embodiments, the sensors 2418 may include image sensors such as digital cameras or barcode readers.

The input/output expander interface 2458 allows external modules to be connected to the first asset tracking device 2450. For example, an input/output expander 2480 may connect to the first asset tracking device 2450 via the input/output expander interface 2458 providing additional input and/or output capability not provided by the sensors 2418.

The input/output (I/O) expander 2480 is comprised of a controller 2484, an input/output expander interface 2482 and external sensors 2486. In some embodiments (not shown), the I/O expander may contain output devices such as speakers or displays.

The I/O expander interface 2482 connects with the I/O expander interface 2458 of the first asset tracking device 2450 for transferring data between the I/O expander 2480 and the first asset tracking device.

The external sensors 2486 capture data not captured by the sensors 2418 of the first asset tracking device 2450. For example, the external sensors 2486 may comprise image sensors such as digital cameras or barcode readers.

The controller 2484 processes data captured by the external sensors 2486 and provides the processed data to the first asset tracking device 2450 via the I/O expander interface 2482.

Figure 25:
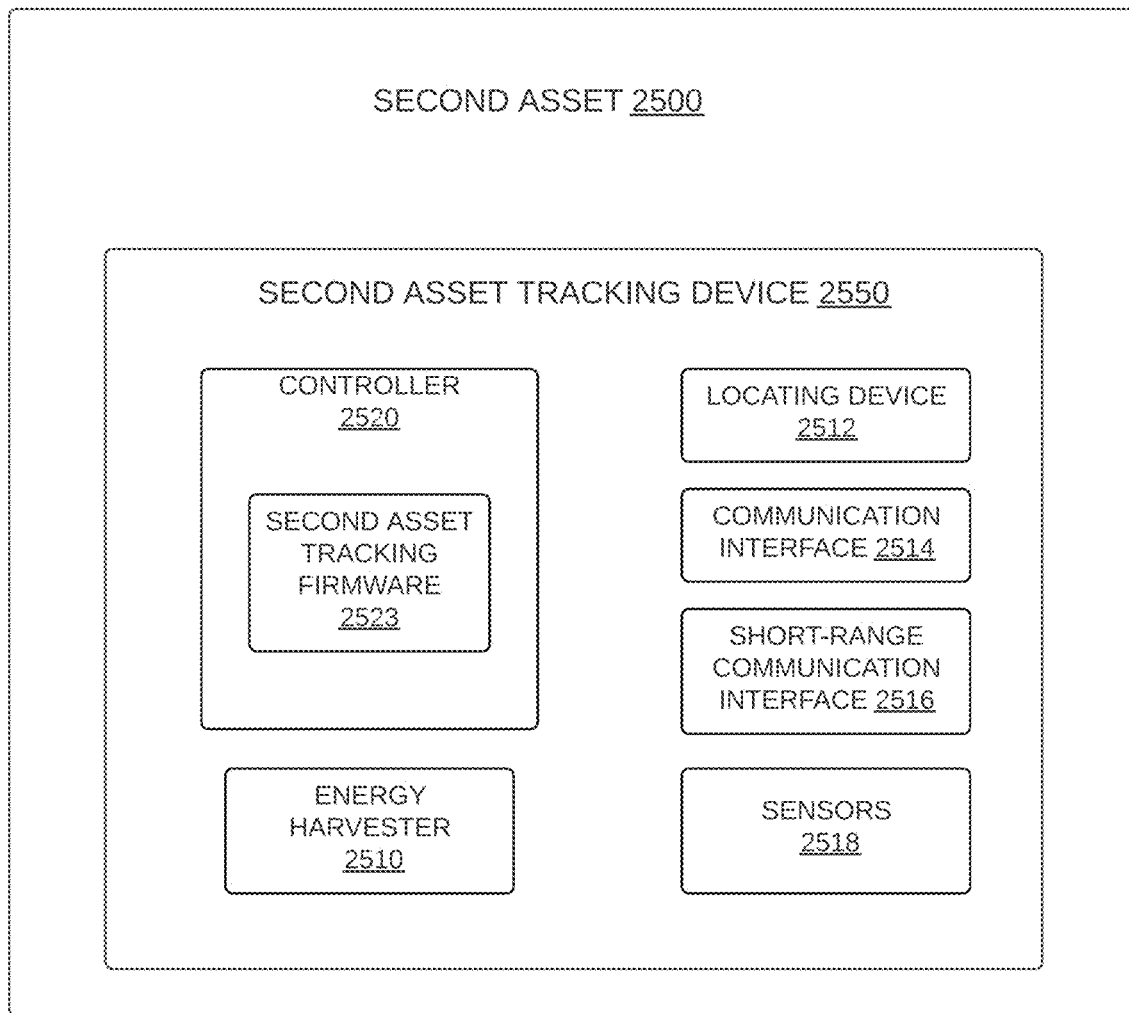
FIG. 25 is a block diagram of a second asset including a second asset tracking device having a second operating mode.

FIG. 25 is a block diagram showing the second asset 2500 including the first asset tracking device 2450 deployed therein. Since the second asset 2500 is a truck trailer, the second asset tracking device 2550 is shown as disposed in the second asset 2500 without being coupled thereto.

The second asset tracking device 2550 is comprised of an energy harvester 2510, a locating device 2512, a communication interface 2514, a short-range communication interface 2516, one or more sensors 2518, and a controller 2520.

The energy harvester 2510 is a device which provides electrical energy for operating the second asset tracking device 2550. The energy harvester 2510 may be a battery, a solar panel, or a kinetic harvester which generates electrical energy from motion.

The locating device 2512, the communication interface 2514, the short-range communication interface 2516, and the sensors 2518 may be similar to the locating device 2412, the communication interface 2414, the short-range communication interface 2416, and the sensors 2418, respectively.

The controller 2520 may be similar to the controller 2420 but may execute second asset tracking firmware instructions 2523 which configure the second asset tracking device 2550 to carry out some of the methods of the present disclosure.

When the first asset 2400 and the second asset 2500 are coupled together as shown in FIG. 23, some of the first asset telematics data 2457 and the second asset telematics data 2557 will be substantially similar. For example, the first location information of the first asset 2400 and the second location information of the second asset 2500 will be substantially similar and may be identical depending on the resolution of the locating system 2310. Similarly, ambient temperature detected by a temperature sensor of the first asset tracking device 2450 may be substantially similar to the ambient temperature detected by a temperature sensor of the second asset tracking device 2550. In some cases, however, some sensors may exist on the first asset tracking device 2450 but not the second asset tracking device 2550 and vice versa. Furthermore, similar sensors may be deployed or configured differently. For example, a temperature sensor in the first asset tracking device 2450 may be configured to measure ambient temperature, whereas a temperature sensor in the second asset tracking device 2550 may be configured to measure temperature inside a refrigerator.

The first asset tracking device 2450 is powered by the first asset 2400 via the interface port 2425 of the first asset 2400. As a consequence, the first asset tracking device 2450 can operate normally as long as it may draw electric energy from the first asset 2400. When the first asset 2400 is a vehicle asset, the first asset tracking device 2450 draws electric energy from the vehicle's battery. When the first asset 2400 is a vehicle asset being driven, the alternator in the first asset 2400 provides electrical energy to the vehicle's battery. Accordingly, it may be said that the first asset tracking device 2450 can operate normally.

The second asset tracking device 2550 has limited electrical energy supply. The second asset tracking device 2550 obtains electrical energy from the energy harvester 2510. For example, the energy harvester 2510 may be a battery having a capacity that gets depleted as the second asset tracking device 2550 uses that energy. As another example, the energy harvester 2510 may be a solar panel but the second asset tracking device 2550 is being operated overnight during the Winter where no daylight can replenish its energy storage.

In order to prevent the second asset tracking device 2550 from becoming inoperable due to the depletion of the electrical energy available thereto, the second asset tracking device 2550 may be configured into a low-power operating mode. In some embodiments, when the second asset tracking device 2550 is in the low-power operating mode, the second asset tracking device is not gathering data of a specific type. For example, in the low-power operating mode, the second asset tracking device 2550 may not gather location data. In some cases, the low-power operating mode is a sleep mode in which many peripherals of the second asset tracking device 2550 are turned off to save electric power consumption. In other embodiments, when the second asset tracking device 2550 is in the low-power operating mode, the second asset tracking device 2550 is gathering data of the specific type at a reduced rate. For example, the second asset tracking device 2550 may gather location data at specific intervals. In this case, the second asset tracking device 2550 may go into sleep mode and wake up to gather location data at a reduced rate that it normally would if it was a powered device like the first asset tracking device 2450.

It should be noted that, in low-power mode, the second asset tracking device 2550 may not be gathering data of a first type while still gathering data of a second type. For example, the second asset tracking device 2550 may refrain from gathering location data but may gather temperature data. For example, if the second asset 2500 is stationary as indicated by some motion sensors disposed therein, then the second asset tracking device 2550 may not be gathering data of the location type. The second asset tracking device 2550 may still be gathering other data such as temperature or motion (accelerometer) data. In this case, the power consumption by the second asset tracking device 2550 is reduced since it does not have the locating device 2512 powered on. Furthermore, the temperature data may be gathered at a reduced rate thus further reducing the power consumption of the second asset tracking device 2550.

Figure 26:
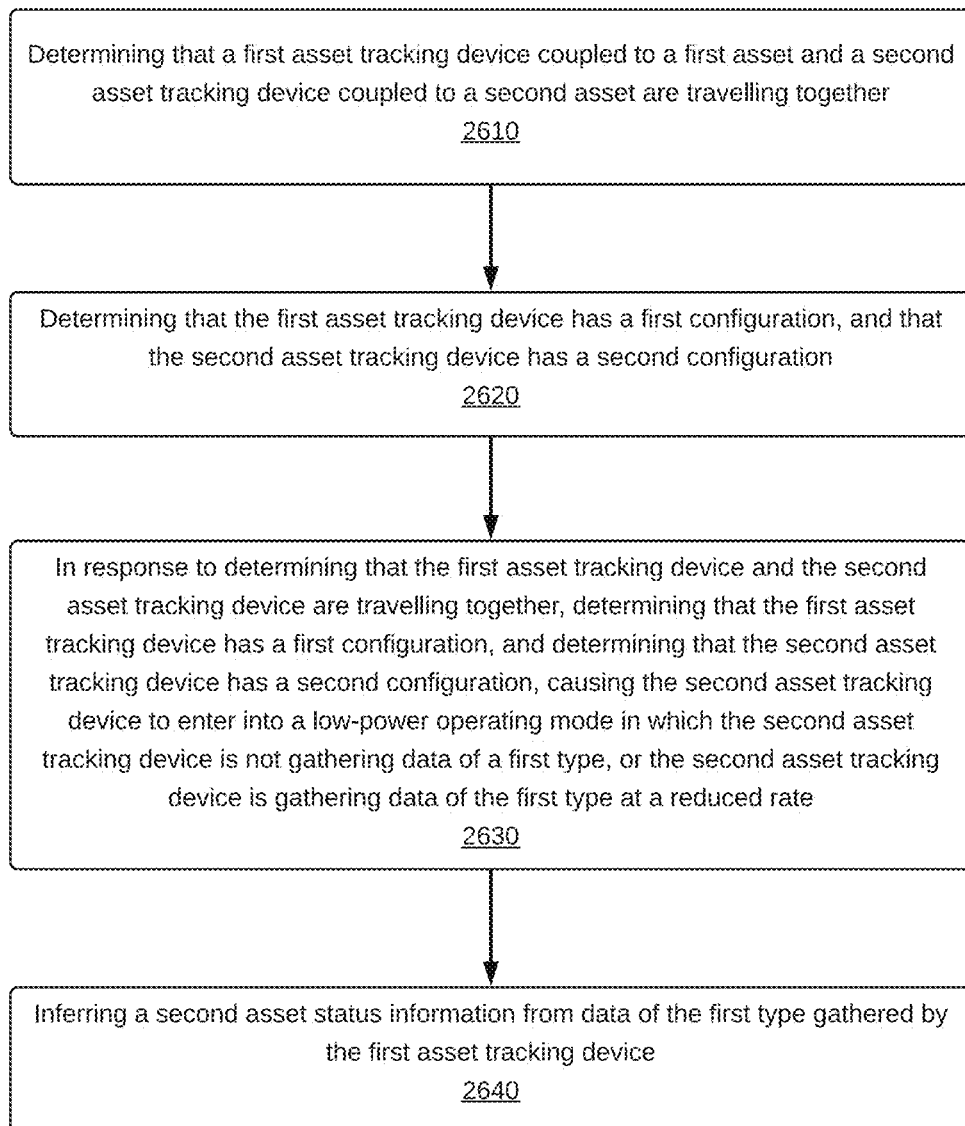
FIG. 26 is a flow chart of a method of inferring second asset status information from data of a first type gathered by a first asset tracking device, in accordance with embodiments of the present disclosure.

Staying in low-power mode for some time reduces the power consumption of the second asset tracking device 2550. Accordingly, the possibility of becoming inoperable due to the depletion of the electrical energy available thereto is reduced. However, in some cases, it is not ideal to gather some data at a reduced rate as some information may be missed. For example, if the second asset tracking device 2550 is not gathering location or motion data, then the second asset 2500 moves, the location of the second asset 2500 will not be known. In FIG. 26, the present disclosure provides a method 2600 which attempts to overcome this issue by inferring a second asset status information, such as the location of the second asset 2500 from data of a first type, such as location, gathered by the first asset tracking device 2450 when it is determined that both the first asset tracking device 2450 and the second asset tracking device 2550 are travelling together and it is determined that the first asset tracking device 2450 is connected to a power source while the second asset tracking device 2550 is not connected to a power source.

The method 2600 begins at step 2610. At step 2610, it is determined that the first asset tracking device 2450 coupled to the first asset 2400 and the second asset tracking device 2550 coupled to the second asset 2500 are travelling together.

At step 2620, it is determined that the first asset tracking device has a first operating mode, and that the second asset tracking device has a second operating mode, which is different from the first operating mode.

In response to determining that the first asset tracking device 2450 and the second asset tracking device 2550 are travelling together, determining that the first asset tracking device 2450 has a first operating mode, and determining that the second asset tracking device 2550 has a second operating mode different from the first operating mode, step 2630 includes causing the second asset tracking device 2550 to enter into a low-power operating mode in which the second asset tracking device 2550 is not gathering data of a first type, or the second asset tracking device 2550 is gathering data of the first type at a reduced rate.

Step 2640 includes inferring a second asset status information from data of the first type gathered by the first asset tracking device.

In some embodiments, determining that the first asset tracking device 2450 and the second asset tracking device 2550 are travelling together may comprise determining, by the asset tracking device management system 2320, that the first asset tracking device 2450 has a first travel history which is similar to a second travel history of the second asset tracking device 2550.

In some embodiments, determining that the first travel history is similar to the second travel history may comprise comparing a first plurality of locations reported by the first asset tracking device 2450 and a second plurality of locations reported by the second asset tracking device 2550 and determining that the first plurality of locations and the second plurality of locations are substantially equal. The first plurality of locations and the second plurality of locations are reported at substantially similar times.

When tracking assets, it is sometimes useful to place boundaries on a map to determine whether assets have passed certain points or are located within particular zones. In this disclosure, a "tripwire" represents a line on a map which may trigger an event on an asset tracking device or on an asset tracking management system when it is crossed by the asset tracking device. In this disclosure, a "geofence" represents a closed polygon that defines a zone on a map. When an asset tracking device crosses into a zone defined by a geofence, this may trigger an event on the asset tracking device or on an asset tracking management system. The event may represent entering into the zone, exiting from the zone, being inside the zone for a period of time, and so on.

In some embodiments, determining that the first asset tracking device 2450 and the second asset tracking device 2550 are travelling together comprises detecting that the first asset tracking device 2450 and the second asset tracking device 2550 have crossed the same tripwire at substantially the same time. If a plurality of tripwires are defined in a region, and both the first asset tracking device 2450 and the second asset tracking device cross the same tripwire at substantially similar times, then may be determined that the first asset tracking device 2450 and the second asset tracking device 2550 are travelling together. For example, if the first asset tracking device 2450 crosses a first tripwire, and within a few seconds the second asset tracking device 2550 crosses the first tripwire, there is a possibility that the first asset tracking device 2450 and the second asset tracking device 2550 are travelling together. If the first asset tracking device crosses a second tripwire followed, within a few seconds, by the second asset tracking device 2550 crossing the second tripwire, then there is a higher probability that both the first asset tracking device 2450 and the second asset tracking device 2550 are travelling together.

In some embodiments, determining that the first asset tracking device 2450 and the second asset tracking device 2550 are travelling together comprises detecting that the first asset tracking device 2450 and the second asset tracking device 2550 have crossed the same geofence into the same zone defined by the geofence, remained within the same zone at substantially the same time, and exited the same zone at substantially the same time. In some cases, the first asset tracking device 2450 and the second asset tracking device are determined to be travelling together when they have entered and exited two or more zones defined by corresponding geofences.

In some embodiments, determining that the first asset tracking device 2450 and the second asset tracking device 2550 are travelling together comprises detecting, by the first asset tracking device 2450, a short-range communication connection between the first asset tracking device 2450 and the second asset tracking device 2550. For example, the first asset tracking device 2450 may accept connections to the short-range communication interface 2416 thereof. The second asset tracking device 2550 may connect, via the short-range communication interface 2516 thereof, to the short-range communication interface 2416 of the first asset tracking device 2450. Since the connection is a short-range communication connection, the first asset tracking device 2450 determines that the second asset tracking device 2550 is in proximity thereto and accordingly, the first asset tracking device 2450 and the second asset tracking device 2550 are travelling together.

In some embodiments the short-range communication connection between the first asset tracking device 2450 and the second asset tracking device 2550 is a Bluetooth connection and the second asset tracking device 2550 is paired to the first asset tracking device 2450 over the Bluetooth connection. For example, the short-range communication interface 2416 of the first asset tracking device 2450 may be a Bluetooth interface that accept Bluetooth connections from one or more asset tracking devices such as the second asset tracking device 2550. The short-range communication interface 2516 of the second asset tracking device 2550 may be a Bluetooth interface that is configured to search for a Bluetooth interface accepting connections such as the short-range communication interface 2416 of the first asset tracking device. Upon finding the short-range communication interface 2416, the second asset tracking device 2550 may request pairing with the first asset tracking device 2450. In some embodiments, subsequent to pairing with the first asset tracking device 2450, the second asset tracking device 2550 may send to the first asset tracking device, over the short-range communication connection an identification thereof indicating that it is an asset tracking device connected with the same asset tracking management system 2320.

In some embodiments, determining that the first asset tracking device 2450 and the second asset tracking device 2550 are travelling together comprises detecting, by the first asset tracking device 2450, a unique identifier linked to the second asset 2500. For example, the second asset 2500 may be truck trailer as shown in FIG. 23. The truck trailer may have a unique identifier such as a barcode or a Quick Response (QR) code. The first asset tracking device 2450 may capture an image of the unique identifier linked to the second asset 2500, such as a barcode imprinted on the second asset. The first asset tracking device 2450 may have an image-capturing device connected therewith. In one example, the sensors 2418 may include an image-capturing device which may be oriented to capture an image of the unique identifier linked to the second asset. In another example, the first asset tracking device 2450 may have an I/O expander 2480 connected thereto as shown in FIG. 24. The external sensors 2486 of the I/O expander 2480 may include an image-capturing device positioned to capture a unique identifier linked to the second asset. For example, the I/O expander 2480 may be placed on a transport truck facing the rear direction to capture a barcode or a QR code on a transport trailer connected to the transport truck. The first asset tracking firmware 2422 of the first asset tracking device 2450 may contain machine-executable programming instructions that when executed by the controller 2420 instruct the I/O expander 2480 to capture, by an image-capturing device, a unique identifier linked to the second asset 2500, such as an image of the barcode or QR code on the second asset 2500. The first asset tracking firmware 2422 may also configure the controller 2420 to receive, via the I/O expander interface 2458, a captured image of the unique identifier linked to the second asset. The first asset tracking firmware 2422 may further process the captured image of the unique identifier linked to the second asset 2500 to extract the unique identifier linked to the second asset 2500. In some embodiments, the unique identifier that identifies the second asset 2500 contains an identifier of the second asset tracking device. In other embodiments, the first asset tracking device 2450 queries the asset tracking device management system 2320 for a unique identifier of the second asset tracking device 2550. The asset tracking device management system 2320 may contain a database associating the second asset 2500 with the second asset tracking device 2550.

In some embodiments, determining that the first asset tracking device 2450 has a first operating mode comprises detecting that the first asset tracking device 2450 is connected to an external power source. For example, the external power source may be a vehicle diagnostic port such as the interface port 2425. In some embodiments, the first asset tracking firmware 2422 sends, via the communication interface 2414, an indication to the asset tracking device management system 2320 that the first asset tracking device 2450 is connected to the interface port 2425. Accordingly, the asset tracking device management system 2320 identifies the first asset tracking device 2450 as an asset tracking device having a first operating mode.

In some embodiments, determining that the second asset tracking device 2550 has a second operating mode comprises determining that the second asset tracking device 2550 is powered by an energy harvester 2510 such as a solar panel or a battery. In some embodiments, the second asset tracking firmware 2523 sends, via the communication interface 2514, an indication to the asset tracking device management system 2320 that the second asset tracking device 2550 is powered by an energy harvester 2510. Accordingly, the asset tracking device management system 2320 identifies the second asset tracking device 2550 as an asset tracking device having a second operating mode, which is different from the first operating mode of the first asset tracking device 2450.

In some embodiments, causing the second asset tracking device 2550 to enter into the low-power operating mode is only done in response to determining that the locating device 2512 of the second asset tracking device 2550 does not have sufficient power. For example, if the energy harvester 2510 is a battery and the battery capacity is low or if the energy harvester 2510 is a solar panel and the weather conditions are cloudy, then the energy harvester may not be able to provide sufficient power to the locating device 2512. In this case, the second asset tracking device 2550 may enter into a low-power mode in which it is either not gathering location information or gathering location information at a reduced rate.

In some embodiments, causing the second asset tracking device 2550 to enter into the low-power operating mode is only done in response to determining that the communication interface 2514 of the second asset tracking device 2550 does not have sufficient power. For example, if the energy harvester 2510 is a battery and the battery capacity is low or if the energy harvester 2510 is a solar panel and the weather conditions are cloudy, then the energy harvester may not be able to provide sufficient power to the communication interface 2514. In this case, the second asset tracking device 2550 may enter into low-power mode in which the communication interface 2514 is powered off. The second asset tracking firmware 2523 may configure the second asset tracking device 2550 to power off the communication interface 2514 of the second asset tracking device 2550. In some embodiments, the communication interface 2514 is a cellular modem.

In some embodiments, data of the first type comprises location data and causing the second asset tracking device to enter into a low-power operating mode comprises turning off the location module of the second asset tracking device 2550. The second asset tracking firmware 2523 may configure the second asset tracking device 2550 to power off the locating device 2512.

In some embodiments, causing the second asset tracking device 2550 to enter into a low-power operating mode in which the second asset tracking device is gathering data of the first type at a reduced rate comprises causing the second asset tracking device 2550 to enter low-power operating mode and periodically exit the low-power mode and gather data of the first type.

In some embodiments, causing the second asset tracking device 2550 to periodically exit low-power mode and gather data of the first type comprises periodically turning on a sensor module for gathering data of the first type and reading sensor data of the first type from the sensor module while the sensor module is turned on. For example, the second asset tracking firmware 2523 may configure the second asset tracking device 2550 to power off the locating device 2512 and periodically power it on to capture location data at a reduced rate. For example, the locating device 2512 may be powered on once every 30 seconds to gather location data, then the locating device 2512 may be powered off for 30 seconds before being powered on again the next time to further gather location data.

As discussed above, in some embodiments, the second asset tracking device 2550 may turn off the communication interface 2514 to reduce power consumption particularly in response to determining that the communication interface 2514 does not have sufficient power. In some embodiments, the asset tracking device management system 2320 infers second asset status information from data of a first type gathered by the first asset tracking device 2450. For example, the location of the second asset may be inferred from the location data reported by the first asset tracking device 2450. In other embodiments, the second asset tracking device 2550 is gathering data of a second type, which is not gathered by the first asset tracking device 2450. In this case, it is not feasible to infer a second asset status information from data for the first type gathered by the first asset tracking device 2450. For example, the second asset tracking device 2550 may contain a pressure sensor or a radioactivity sensor among the sensors 2518. Such sensors may not be part of the sensors 2418 of the first asset tracking device 2450. In case the communication interface 2514 of the second asset tracking device 2550 is powered-off, there needs to be other means for sending data of the second type, such as pressure or radioactivity data, to the asset tracking device management system 2320. In some embodiments, the second asset tracking device 2550 may send data of the second type to the first asset tracking device 2450 over a short-range communication connection. The first asset tracking device 2450 may relay the data of the second type to the asset tracking device management system 2320.

In some embodiments, when the first asset tracking device 2450 and the second asset tracking device are no longer travelling together, then some of the steps of the above-described methods need to be reversed. It may no longer be feasible to infer status information about the second asset 2500 from data of a first type gathered by the first asset tracking device 2450 since the first asset tracking device 2450 and the second asset tracking device 2550 are no travelling together. For example, if the transport trailer is disconnected from the transport truck, their locations will be different. Accordingly, in response to determining that the first asset tracking device 2450 and the second asset tracking device 2550 are no longer travelling together, the second asset tracking device exits from the low-power operating mode. The second asset tracking device 2550 exiting from the low-power operating mode may comprise gathering data of the first type at a regular rate and sending the data of the first type to an asset tracking device management system 2320. In this case, the second asset status information is inferred from data of the first type gathered by the second asset tracking device 2550.

It should be recognized that features and aspects of the various examples provided above can be combined into further examples that also fall within the scope of the present disclosure. The scope of the claims should not be limited by the above examples but should be given the broadest interpretation consistent with the description as a whole.

What is claimed is:

1. A method, comprising:
   determining that a first asset tracking device coupled to a first asset and a second asset tracking device coupled to a second asset are travelling together;
   determining that the first asset tracking device has a first operating mode, and that the second asset tracking device has a second operating mode which is different from the first operating mode;
   in response to determining that the first asset tracking device and the second asset tracking device are travelling together, determining that the first asset tracking device has the first operating mode, and determining that the second asset tracking device has the second operating mode:
   causing the second asset tracking device to enter into a low-power operating mode in which:
   the second asset tracking device is not gathering data of a first type, or
   the second asset tracking device is gathering data of the first type at a reduced rate; and
   inferring a second asset status information from data of a first type gathered by the first asset tracking device;
   wherein determining that the first asset tracking device and the second asset tracking device are travelling together comprises detecting, by the first asset tracking device, a unique identifier linked to the second asset, wherein detecting the unique identifier comprises capturing an image by an image-capturing device connected with the first asset tracking device and recognizing the unique identifier within the image, and wherein the image-capturing device is connected to the first asset tracking device via an input/output expander.

2. The method of claim 1, wherein determining that the first asset tracking device and the second asset tracking device are travelling together comprises determining, by an asset tracking device management system, that the first asset tracking device has a first travel history which is similar to a second travel history of the second asset tracking device.

3. The method of claim 2, wherein determining that the first travel history is similar to the second travel history comprises:
   comparing a first plurality of locations reported by the first asset tracking device and a second plurality of locations reported by the second asset tracking device, the first plurality of locations and the second plurality of locations reported at substantially similar times; and
   determining that the first plurality of locations and the second plurality of locations are substantially equal.

4. The method of claim 1, wherein determining that the first asset tracking device and the second asset tracking device are travelling together comprises detecting, by the first asset tracking device, a short-range communication connection between the first asset tracking device and the second asset tracking device.

5. The method of claim 1, wherein the short-range communication connection comprises a short-range wireless connection over the industrial, scientific or medical (ISM) unlicensed band.

6. The method of claim 4, wherein:
   the short-range communication connection comprises a Bluetooth connection; and
   detecting a short-range communication connection between the first asset tracking device and the second asset tracking device comprises detecting that the second asset tracking device is paired to the first asset tracking device over the Bluetooth connection.

7. The method of claim 1, wherein the unique identifier comprises an image of a barcode identifying the second asset.

8. The method of claim 1, wherein determining that the first asset tracking device has a first operating mode comprises determining that the first asset tracking device is connected to an external power source.

9. The method of claim 1, wherein determining that the second asset tracking device has a second operating mode comprises determining that the second asset tracking device is powered by an energy harvester.

10. The method of claim 1, wherein causing the second asset tracking device to enter into the low-power operating mode is only done in response to determining that a locating device of the second asset tracking device does not have sufficient power.

11. The method of claim 1, wherein causing the second asset tracking device to enter into the low-power operating mode is only done in response to determining that a communication interface of the second asset tracking device does not have sufficient power.

12. The method of claim 1, wherein causing the second asset tracking device to enter into a low-power operating mode in which the second asset tracking device is not gathering data of a first type comprises turning off a communication interface of the second asset tracking device.

13. The method of claim 12, wherein:
data of the first type comprises location data; and
causing the second asset tracking device to enter into a low-power operating mode in which the second asset tracking device is not gathering data of a first type comprises turning off a location module of the second asset tracking device.

14. The method of claim 1, wherein causing the second asset tracking device to enter into a low-power operating mode in which the second asset tracking is gathering data of the first type at a reduced rate comprises:
causing the second asset tracking device to enter into a low-power operating mode; and
causing the second asset tracking device to periodically exit low-power mode and gather data of the first type.

15. The method of claim 14, wherein causing the second asset tracking device to periodically exit low-power mode and gather data of the first type comprises:
periodically turning on a sensor module for gathering data of the first type; and
reading sensor data of the first type from the sensor module while the sensor module is turned on.

16. The method of claim 1, further comprising:
gathering data of a second type, by the second asset tracking device;
sending, by the second asset tracking device, the data of the second type to the first asset tracking device over a short-range communication connection; and
relaying, by the first asset tracking device, the data of the second type to an asset tracking device management system.

17. The method of claim 1 wherein determining that the first asset tracking device and the second asset tracking device are travelling together comprises detecting that the first asset tracking device and the second asset tracking device have each crossed at least one tripwire at substantially the same time.

18. The method of claim 1 wherein determining that the first asset tracking device and the second asset tracking device are travelling together comprises:
detecting that the first asset tracking device and the second asset tracking device have each:
entered a zone;
exited the zone; or
remained within the zone at substantially the time;
wherein the zone is defined by a geofence.

19. A method, comprising:
determining that a first asset tracking device coupled to a first asset and a second asset tracking device coupled to a second asset are travelling together;
determining that the first asset tracking device is has a first operating mode, and that the second asset tracking device has a second operating mode which is different from the first operating mode;
in response to determining that the first asset tracking device and the second asset tracking device are travelling together, determining that the first asset tracking device has the first operating mode, and determining that the second asset tracking device has the second operating mode:
causing the second asset tracking device to enter into a low-power operating mode in which:
the second asset tracking device is not gathering data of a first type, or
the second asset tracking device is gathering data of the first type at a reduced rate;
inferring a second asset status information from data of a first type gathered by the first asset tracking device;
determining that the first asset tracking device and the second asset tracking device are no longer travelling together;
in response to determining that the first asset tracking device and the second asset tracking device are no longer travelling together:
causing the second asset tracking device to exit from the low-power operating mode, including:
gathering data of the first type at a regular rate;
sending the data of the first type to an asset tracking device management system; and
inferring the second asset status information from data of the first type gathered by the second asset tracking device.

* * * * *